(12) United States Patent
Pei et al.

(10) Patent No.: US 8,521,904 B1
(45) Date of Patent: Aug. 27, 2013

(54) DEVICES, SYSTEMS, AND/OR METHODS FOR DETERMINING INTERNET TOPOLOGY

(75) Inventors: Dan Pei, Jersey City, NJ (US); Lixia Zhang, Sherman Oaks, CA (US); Ricardo Oliveira, Los Angeles, CA (US); Walter Willinger, Madison, NJ (US); Beichuan Zhang, Tucson, AZ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 982 days.

(21) Appl. No.: 12/335,820

(22) Filed: Dec. 16, 2008

(51) Int. Cl.
*G06F 15/173* (2006.01)
*H04L 12/28* (2006.01)

(52) U.S. Cl.
USPC .......................................... 709/238; 370/255

(58) Field of Classification Search
USPC ................................. 709/238; 370/254–258
See application file for complete search history.

(56) References Cited

U.S. PATENT DOCUMENTS

| | | | |
|---|---|---|---|
| 6,298,123 B1 * | 10/2001 | Nolting et al. | 379/111 |
| 6,574,663 B1 | 6/2003 | Bakshi | |
| 6,965,870 B1 * | 11/2005 | Petras et al. | 705/14.54 |
| 7,069,343 B2 | 6/2006 | Goringe | |
| 7,200,120 B1 | 4/2007 | Greenberg | |
| 7,200,122 B2 | 4/2007 | Goringe | |
| 7,240,325 B2 | 7/2007 | Keller | |
| 7,626,948 B1 * | 12/2009 | Cook et al. | 370/256 |
| 8,144,611 B2 * | 3/2012 | Agarwal et al. | 370/252 |
| 2005/0044208 A1 | 2/2005 | Jones | |
| 2005/0050225 A1 | 3/2005 | Tatman | |
| 2005/0213558 A1 * | 9/2005 | Levit et al. | 370/351 |
| 2006/0020525 A1 * | 1/2006 | Borelli et al. | 705/34 |
| 2006/0129460 A1 * | 6/2006 | Tobin | 705/26 |
| 2006/0212353 A1 * | 9/2006 | Roslov et al. | 705/14 |
| 2006/0268739 A1 | 11/2006 | Garcia | |
| 2008/0228940 A1 * | 9/2008 | Thubert | 709/238 |
| 2010/0325018 A1 * | 12/2010 | Borelli et al. | 705/27.1 |
| 2011/0022475 A1 * | 1/2011 | Inbar et al. | 705/14.66 |

FOREIGN PATENT DOCUMENTS

WO  WO01/86844  11/2001

OTHER PUBLICATIONS

Cohen et al., The Internet Dark Matter—on the Missing Links in the AS Connectivity Map, 2006, http://citeseer.ist.psu.edu/viewdoc/summary?doi=10.1.1.112.914.*

Pei et al., Quantifying the Completeness of the Observed Internet AS-level Structure, Sep. 2008, http://irl.cs.ucla.edu/~rveloso/pubs.html.*

Oliveira et al., Visualizing Internet Topology Dynamics with Cyclops, Sep. 2007.*

Advanced Network Technology Center, University of Oregon, "RouteViews routing table archive", Jan. 27, 2005, http://www.routeviews.org/.

AOL, "AOL peering requirements", Feb. 28, 2006, http://www.atdn.net/settlement_free_int.shtml.

(Continued)

*Primary Examiner* — Joseph Avellino
*Assistant Examiner* — James Conaway
(74) *Attorney, Agent, or Firm* — Akerman Senterfitt; Michael K. Dixon; Roy Zachariah

(57) ABSTRACT

Certain exemplary embodiments can provide a method, which can comprise, based upon a quantified completeness of a determined topology of an interconnected set of Autonomous Systems of the Internet, at a user interface of an information device, automatically rendering a determined identity of a customer to which telecommunications products will be offered.

15 Claims, 11 Drawing Sheets

(56) References Cited

OTHER PUBLICATIONS

AT&T Corp., "AT&T peering requirements", accessed prior to Dec. 16, 2008 at: http://www.corpatt.com/peering/.

Ballani, "A Study of Prefix Hijacking and Interception in the Internet", Aug. 27, 2007, 12 page(s), Proc. of ACM SIGCOMM'07.

CAIDA (Cooperative Association for Internet Data Analysis), "Skitter AS adjacency list", Aug. 29, 2008, http://www.caida.org/data/active/skitter_aslinks_dataset.xml.

Chang, "An Economic-Based Empirical Approach to Modeling the Internet's Inter-Domain Topology and Traffic Matrix", Jan. 1, 2006, 160 page(s), PhD Thesis, University of Michigan.

Chang, "Difficulties Measuring the Internet's AS-Level Ecosystem", Mar. 1, 2006, pp. 1479-1483, In Annual Conference on Information Sciences and Systems (CISS'06).

Chang, "Inferring AS-Level Internet Topology from Router-Level Path Traces", Jan. 1, 2001, 12 page(s), SPIE ITCom, 2001.

Chang, "To Peer or not to Peer: Modeling the Evolution of the Internet's AS-level Topology", Apr. 1, 2006, 12 page(s), INFOCOM 2006, 25th IEEE International Conference on Computer Communications Proc.

Chang, "Towards Capturing Representative AS-Level Internet Topologies", Apr. 22, 2004, Elsevier Computer Networks Journal, 44(6).

Dante, "Geant2 looking glass", accessed prior to Dec. 16, 2008: http://stats.geant2.net/lg/.

Dimitropoulos, "As Relationships: Inference and Validation", Dec. 7, 2006, 10 page(s), ACM SIGCOMM Computer Communication Review.

Dolev, "Internet Resiliency to Attacks and Failures Under BGP Policy Routing", Nov. 1, 2006, 14 page(s), Elsevier, Computer Networks, 50(16).

Gao, "On Inferring Autonomous System Relationships in the Internet", Dec. 1, 2001, 13 page(s), IEEE/ACM Transactions on Networking, 9(6).

He, "A Systematic Framework for Unearthing the Missing Links: Measurements and Impact ", Mar. 17, 2007, 22 page(s), Proc. of Networked Systems Design & Implementation, 2007.

Hyun, "On Third-party Addresses in Traceroute Paths", Apr. 1, 2003, 30 page(s), Proc. of Passive and Active Measurement Workshop (PAM), 2003.

Internet2, "The Internet2 Observatory Data Collections", accessed prior to Dec. 16, 2008: http://www.internet2.edu/observatory/archive/data_collections.html.

Lad, "Understanding Resiliency of Internet Topology Against Prefix Hijack Attacks", Jan. 1, 2007, 10 page(s), 37th Annual IEEE/IFIP International Conference on Dependable Systems and Networks (DSN'07).

Li, "A First-Principles Approach to Understanding the Internet's Router-level Topology", Aug. 30, 2004, 12 page(s), Proc. of ACM SIGCOMM 2004.

Madhyastha, "iPlane: An Information Plane for Distributed Services", Sep. 6, 2006, 31 page(s), Proc. of OSDI, 2006.

Mahadevan, "Orbis: Resealing Degree Correlations to Generate Annotated Internet Topologies", Aug. 27, 2007, 12 page(s), ACM SIGCOMM'07.

Mahadevan, "Systematic Topology Analysis and Generation Using Degree Correlations", Jul. 29, 2006, 13 page(s), ACM SIGCOMM'06.

Mahajan, "Understanding BGP Misconfiguration", Aug. 19, 2002, 14 page(s), Proc. of ACM SIGCOMM'02.

Mao, "On AS-Level Path Inference", Jun. 6, 2005, 11 page(s), ACM SIGMETRICS'05,.

Mao, "Towards an Accurate As-Level Traceroute Tool", Aug. 25, 2003, 14 page(s), Proc. of ACM SIGCOMM, 2003.

Merit Network, "Internet Routing Registry", http://www.irr.net/ accessed prior to Dec. 16, 2008.

Muhlbauer, "Building an AS-Topology Model that Captures Route Diversity", Sep. 11, 2006, 12 page(s), ACM SIGCOMM'06.

Muhlbauer, "In Search for an Appropriate Granularity to Model Routing Policies", Aug. 27, 2007, ACM SIGCOMM'07.

"European Internet Exchange Association", http://www.euro-ix.net Accessed prior to Dec. 16, 2008.

Oliveira, "In Search of the Elusive Ground Truth: The Internet's AS-level Connectivity Structure", Jun. 1, 2008, 26 page(s), Proc. ACM Sigmetics.

Oliveira, "Observing the Evolution of Internet AS Topology", Aug. 27, 2007, 12 page(s).

Oliveira, "Quantifying Path Exploration in the Internet", Oct. 25, 2006, 14 page(s), Proc. 6th ACM SIGCOMM Conference on Internet Measurement.

PCH, "Packet Clearing House IXP Directory", 10 page(s), http://www.pch.net/ixpdir/Main.pl Accessed prior to Dec. 16, 2008.

PeeringDB, "Peering DB website", Jan. 1, 2004, http//www.peeringdb.com.

Raz, "The Internet Dark Matter—on the Missing Links in the AS Connectivity Map", Apr. 1, 2006, 12 page(s), INFOCOM 2006, 25th IEEE International Conference on Computer Communications Proceedings.

Rekhter, "A Border Gateway Protocol 4 (BGP-4)", Jan. 1, 2006, 103 page(s), Internet Society, Internet Engineering Taskforce.

RIPE NNC, "Ripe Routing Information Service Project", http://www.ripe.net/ Accessed prior to Dec. 16, 2008.

Shavitt, "DIMES: Let the Internet Measure Itself", Oct. 1, 2005, 4 page(s), ACM SIGCOMM Computer Communication Review, 35(5).

Siganos, "Analyzing BGP Policies: Methodology and Tool", Mar. 7, 2004, 12 page(s), INFOCOM 2004-23RD Annual Joint Conference of the IEEE Computer and Communications Societies.

Subramanian, "Characterizing the Internet Hierarchy from Multiple Vantage Points", Nov. 7, 2002, 10 page(s), Proc. of INFOCOM'02—21st Annual Joint Conference of the IEEE Computer and Communications Societies.

Subramanian, "HLP: A Next Generation Inter-Domain Routing Protocol", Oct. 28, 2005, 18 page(s), ACM, Proc. of 05 Conference on Applications, technologies, architectures, and protocols for computer communications.

Wang, "Understanding BGP Session Failures in a Large ISP", Aug. 19, 2002, 9 page(s), ACM, Proc. of 02 Conference on Applications, technologies, architectures, and protocols for Computer Communications.

Woodcock, "Good Practices in Internet Exchange Point Documentation", May 1, 2007, 14 page(s), PCH; http://www.pch.net/resources/papers/ix-documentation-bcp/ix-documentation-bcp-v14en.pdf.

Wu, "Internet Routing Resilience to Failures: Analysis and Implications", Dec. 10, 2007, ACM, CoNEXT'07.

Zhang, "Collecting the Internet As-level Topology", Jan. 1, 2005, 9 page(s), ACM SIGCOMM Computer Communication Review, vol. 35, Issue 1.

Zheng, "A Light-Weight Distributed Scheme for Detecting IP Prefix Hijacks in Real-Time", Aug. 27, 2007, 12 page(s), ACM SIGCOMM'07.

Wang, "On Understanding of Transient Interdomain Routing Failures", 2005, 12 pages, IEEE International Conference on Network Protocols (ICNP'05); http://rio.ecs.umass.edu/mnilpub/papers/icnp05_tech.pdf.

* cited by examiner

US 8,521,904 B1

DEVICES, SYSTEMS, AND/OR METHODS FOR DETERMINING INTERNET TOPOLOGY

BACKGROUND

U.S. Pat. No. 7,240,325 (Keller), which is incorporated by reference herein in its entirety, allegedly discloses a "technique for generating a topology associated with a computing environment comprises the following steps/operations. First, components in the computing environment and their dependencies are identified. Identification comprises computing and traversing at least a portion of a model representative of an existence of one or more relationships associated with at least a portion of the components of the computing environment and which is capable of accounting for a full lifecycle (e.g., including deployment, installation and runtime) associated with at least one component of the computing environment. Then, the one or more identified components are presented in a topological representation based on the one or more relationships associated with the one or more identified components. The topological representation comprises a functional plane, a structural plane and an operational plane respectively corresponding to at least a portion of a functional categorization, a structural categorization and an operational categorization of the model. By way of example, the inventive techniques may be applied to a distributed computing environment. The computing environment may also be an autonomic computing environment." See Abstract.

U.S. Pat. No. 7,069,343 (Goringe), which is incorporated by reference herein in its entirety, allegedly discloses a "system for discovering a topology of a distributed processing network that includes a first topology discovery agent 308 configured to contact a first set of routers to obtain a first type of information stored in each router in the first set of routers; a second topology discovery agent 312 and/or 316 configured to contact a second set of routers to obtain a second type of information stored in each router in the second set of routers, and a phase controller 304 configured to select between the first and second topology discovery agents. The first and second sets of routers are different, and the first and second types of information are different. In one configuration, the first type of information is defined by a network management protocol, and the second type of information is defined by a routing protocol." See Abstract.

U.S. Pat. No. 7,200,120 (Greenberg), which is incorporated by reference herein in its entirety, allegedly discloses the "present invention permits a network operator to maintain a timely view of changes to an operational packet-switched network." See Abstract.

SUMMARY

Certain exemplary embodiments can provide a method, which can comprise, based upon a quantified completeness of a determined topology of an interconnected set of Autonomous Systems of the Internet, at a user interface of an information device, automatically rendering a determined identity of a customer to which telecommunications products will be offered.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Figure 1:
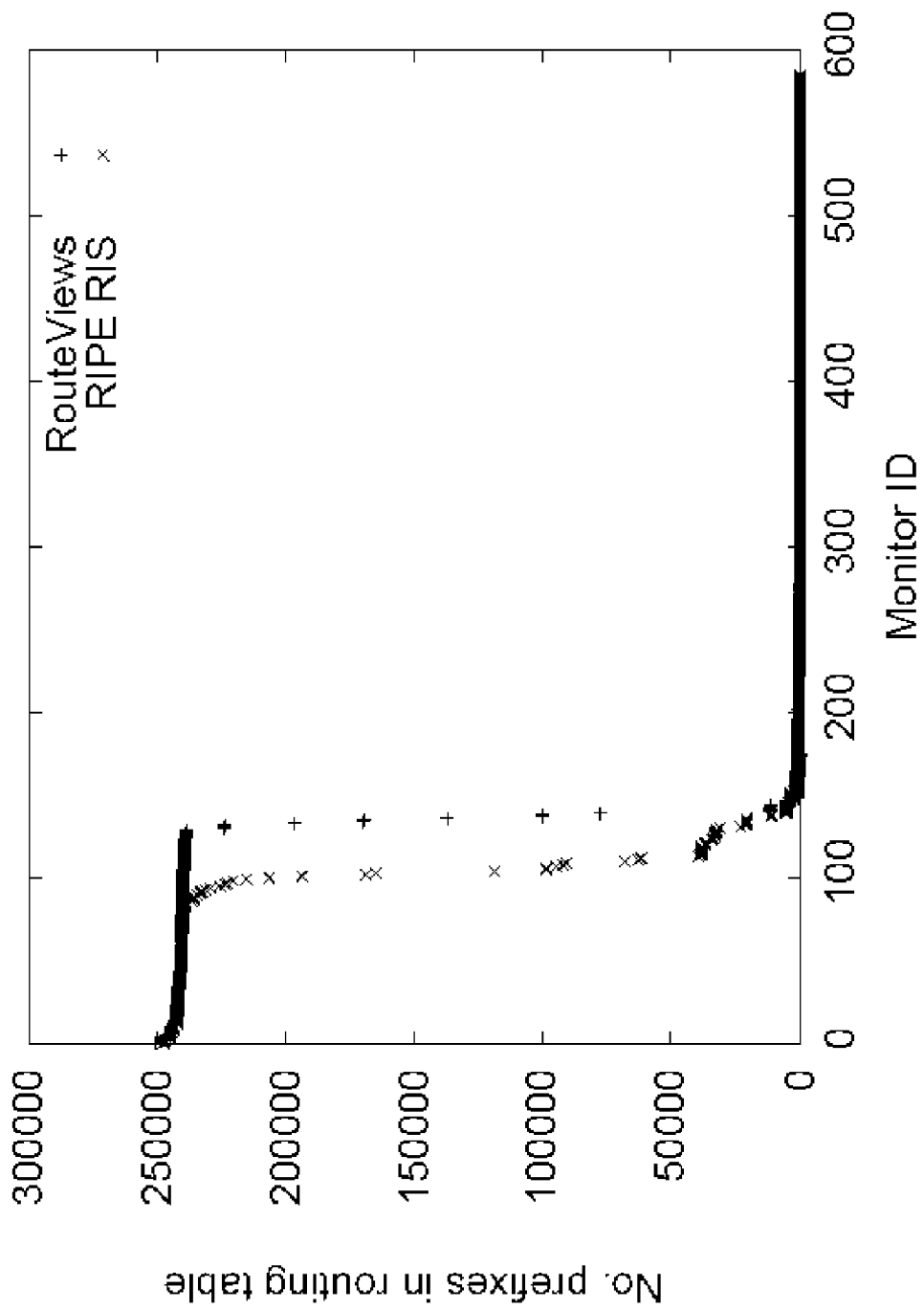
FIG. 1 is a graph of an exemplary representation of the number of prefixes found in routing tables versus a monitor identifier.

Certain exemplary embodiments can provide a method, which can comprise, based upon a quantified completeness of a determined topology of an interconnected set of Autonomous Systems of the Internet, at a user interface of an information device, automatically rendering a determined identity of a customer to which telecommunications products will be offered.

As used herein, the phrase product means something produced by human or mechanical effort or by a natural process. As used herein, the phrase connect means physically or logically join, link, couple, and/or fasten two or more entities. As used herein, the phrase customer means a potential and/or actual purchaser of goods and/or services. As used herein, the phrase service means useful work that does not produce a tangible commodity, work done for the benefit others, and/or a performance of work and/or duties.

The Internet Autonomous System-level topology graph can be used by a telecommunications service provider (e.g., a marketing entity) to understand current/potential customers' connectivity, and/or a competitors' customer base, etc. As used herein, the phrase topology means structure. As used herein, the phrase telecommunications means the science and technology of communication at a distance by electronic transmission of waves, signals, and/or impulses. As used herein, the phrase provider means an entity that supplies telecommunications and/or network services. As used herein, the phrase can means is capable of, in at least some embodiments.

Despite significant efforts to obtain an accurate picture of the Internet's actual Autonomous System-level connectivity structure, much has remained unknown, especially in terms of the completeness of the Autonomous System maps that can be widely used by the research community. As used herein, the phrase system means a collection of mechanisms, devices, machines, articles of manufacture, processes, data, and/or instructions, the collection designed to perform one or more specific functions. As used herein, the phrase structure means that which is complexly constructed, such as a building and/or an addition to a building; a hierarchy and/or placement of objects in a document; and/or a manner in which components are organized and/or form a whole. As used herein, the phrase completeness means a representation of a proportion of a whole that has been tested, monitored, and/or measured. As used herein, the phrase monitor means (n.) a device, system, and/or method adapted to collect network information.

For example, projects such as RouteViews and RIPE-RIS host multiple monitors that establish connections with operational routers inside hundreds of Autonomous Systems. As used herein, the phrase RouteViews means a service that collects global BGP routing information, the information obtained via peering directly with other BGP routers in accordance with a method developed by the University of Oregon. As used herein, the phrase via means by way of and/or utilizing. As used herein, the phrase routing information means routes and/or metrics associated with routes to particular network destinations. As used herein, the phrase associate means to relate, bring together in a relationship, map, combine, join, and/or connect. As used herein, the phrase router means a device adapted to direct traffic and/or determine the next network point to which a data packet should be forwarded enroute toward its destination. The router is connected to at least two networks and determines which way to send each data packet based on its current understanding of the state of the networks it is connected to.

Routers create or maintain a table of the available routes and use this information to determine the best route for a given data packet. Examples include a router, route-reflector, route server, server-based router, router-switch, sets of routers, and/or intra-networking devices, etc. A typical router operates at least at the bottom 3 layers (Physical, Link, and Network layers) of the OSI model. (v.) to select a network path for a message. As used herein, the phrase select means to make and/or indicate a choice and/or selection from among alternatives. As used herein, the phrase RIPE-Routing Information Service means an Internet data collection service of the Réseaux IP Européens ("RIPE"), a European forum open to parties with an interest in the technical development of the Internet, that deploys monitoring devices at many Internet Exchange Points; the monitoring devices communicate with network nodes to collect routing information. As used herein, the phrase route means (n.) a path along which information, such as packets, can be sent. The monitors obtain routing data from the Autonomous Systems over time. As used herein, the phrase monitor means (v.) to observe. As used herein, the phrase Autonomous System (AS) means a set of routers and/or networks under administration of a single entity. As of summer 2008, the Internet comprises more than 27,000 Autonomous Systems (AS). As used herein, the phrase single means existing alone or consisting of one entity. As used herein, the phrase comprise means to include but be not limited to, what follows. As used herein, the phrase not means a negation of something.

Each AS is represented by a unique numeric AS number and may advertise one or more IP address prefixes. As used herein, the phrase represent means to describe and/or symbolize. As used herein, the phrase IP prefix—an IP prefix is the collection of IP addresses for which Routing protocols exchange routes. For example, IP prefix 63.176.232.0/24 represents a range of $2^8$ IP addresses, from 63.176.232.0 to 63.176.232.255. Autonomous Systems run the Border Gateway Protocol to propagate prefix reachability information among themselves. As used herein, the phrase propagate means to transmit to one or more network devices. As used herein, the phrase transmit means to provide, furnish, supply, send as a signal, and/or to convey (e.g., force, energy, and/or information) from one place and/or thing to another. As used herein, the phrase information means facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information. As used herein, the phrase store means to place, hold, retain, enter, and/or copy into and/or onto a machine-readable medium. As used herein, the phrase Border Gateway Protocol (BGP) means a routing protocol used by routers in autonomous systems to propagate and exchange IP prefix reachability information among different autonomous systems, and defined in RFC 4271, Internet Engineering Task Force, January 2006. BGP includes in its routing updates the entire AS-level path to each prefix, which can be used for inferring the AS-level connectivity. As used herein, the phrase infer means to indirectly determine based upon evidence and/or one or more rules applied to the evidence. As used herein, the phrase define means to establish the meaning, relationship, outline, form, and/or structure of; and/or to precisely and/or distinctly describe and/or specify.

Certain exemplary embodiments can quantify the (in)completeness of the machine-determined Autonomous System-level connectivity as seen by the commonly-used vantage points of RouteViews and RIPE-RIS. As used herein, the phrase quantify means to numerically determine and/or calculate. As used herein, the phrase determine means to find out or come to a decision about by investigation, reasoning, or calculation. Calling the current set of vantage points the "public view", certain exemplary embodiments can provide a method for inferring the Autonomous System relationships and then a new heuristic which enables us to identify all the Autonomous Systems whose Autonomous System-level connectivity can be completely captured by the public view. As used herein, the phrase provide means to furnish, supply, give, convey, send, and/or make available. As used herein, the phrase identify means to specify, recognize, detect, and/or establish the identity, origin, nature, and/or definitive characteristics of. As used herein, the phrase all means substantially each and every one. As used herein, the phrase substantially means to a considerable, large, and/or great, but not necessarily whole and/or entire, extent and/or degree.

Results indicate that the public view can be capable of revealing the full connectivity of ~5% of all Autonomous Systems, which includes approximately 77% of large ISPs and approximately 34% of small ISPs, and approximately 0.5% of stub Autonomous Systems. As used herein, the phrase stub Autonomous System means an Autonomous System that does not forward packets for other networks. In the global routing hierarchy, stub networks are at the bottom or at the edge (without any customers or peers), and need transit networks as providers to reach the rest of the Internet. As used herein, the phrase transit network means an Internet Service Provider (ISP) whose business is to provide packet forwarding service between other networks. Transit networks can have their own providers and peers, and can be described as at different tiers, i.e., regional ISPs, national ISPs, and global ISPs. As used herein, the phrase small means relatively low in relative magnitude. As used herein, the phrase Internet service provider (or ISPs) means a provider of data communication services. As used herein, the phrase large means having a relatively great magnitude.

Certain exemplary embodiments can provide evidence that the bulk of the missing connectivity involves peer links below the line of sight of the public view, such as between stub Autonomous Systems and small ISPs as well as among stub Autonomous Systems. As used herein, the phrase missing means a state of not being present at an expected location. As used herein, the phrase link means a physical and/or logical communication channel between a pair of switching and/or routing devices; and/or an activatable connection to another web page, location in a web page, file, and/or other Internet resource. As used herein, the phrase between means in a separating interval and/or intermediate to. Preliminary results towards this direction look promising. Once implemented and deployed, certain exemplary embodiments can help ISPs improve their Internet transit service and/or make more profit by better understanding their customers' need and competitors' existing customer base.

For example, certain exemplary embodiments can provide a data analysis for obtaining new customers and keeping the existing customers. As used herein, the phrase data means information represented in a form suitable for processing by an information device. As used herein, the phrase device means a machine, manufacture, and/or collection thereof. By knowing a potential customer's footprint, the telecommunications provider can evaluate the amount of efforts to obtain this new customer by comparing the telecommunications provider's footprint with the customer's footprint. Similarly, if using the proposed method, we machine-determine an existing customer shows signs of leaving the telecommunications provider, the telecommunications provider can try to improve the service to keep the customer. As used herein, the phrase machine means a device and/or vehicle adapted to perform at least one task. As used herein, the phrase leaving means ceasing to do business with.

By studying a competitor's customer base (based on the more complete Autonomous System-topology), the telecommunications provider can better understand the strength and weakness of the telecommunications provider's network, and better target the potential customer to win from the competitor. As used herein, the phrase network means a communicatively coupled plurality of nodes, communication devices, and/or information devices. As used herein, the phrase plurality means the state of being plural and/or more than one.

Via a network, such devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, multi-domain, and/or multi-zone sub-network and/or protocol, one or more Internet service providers, and/or one or more information devices, such as a switch, router, and/or gateway not directly connected to a local area network, etc., and/or any equivalents thereof. As used herein, the phrase from means used to indicate a source. As used herein, the phrase packet means a generic term for a bundle of data organized in a specific way for transmission, such as within and/or across a network, such as a digital packet-switching network, and comprising the data to be transmitted and certain control information, such as a destination address.

Certain exemplary embodiments can provide needed data analysis for marketing new services (e.g. MPLS VPN, Metro Ethernet) to existing customers. By knowing a customer's more complete footprint via the more complete Autonomous System-level topology around the customer in question, the telecommunications provider can then better target the customer based on the footprint of our offered service or even expand the footprint of the offered service. As used herein, the phrase offer means to propose an available solution, service, and/or product.

Despite significant efforts to obtain an accurate picture of the Internet's actual Autonomous System-level connectivity structure, much has remained unknown, such as in terms of the completeness of the Autonomous System maps that can be widely used by the research community. As a result, ISPs might have only an incomplete picture of their customers' needs and/or the ISPs' competitor's existing customer base. As used herein, the phrase have means to possess. Some might not know how incomplete the topology they use is. Certain exemplary embodiments can quantify the (in)completeness of the machine-determined Autonomous System-level connectivity as seen by the commonly-used vantage points of RouteViews and RIPE-RIS.

BGP routing decisions can be based on routing polices, in which a factor is the business relationship between neighboring Autonomous Systems. More specifically, an Autonomous System might not announce routes containing peer-peer links to its providers or other peers. As used herein, the phrase business relationships between Autonomous Systems means in general there are three major types of relationships between autonomous systems: customer-provider, peer-peer, and sibling-sibling. In a customer-provider relationship, the customer pays the provider for transiting traffic from and to the rest of the Internet, thus the provider can announce routes to the customer. In a peer-peer relationship, which is commonly described as "settlement-free", the two Autonomous Systems exchange traffic without paying each other. Traffic originated from, and destined to, the two peering Autonomous Systems or their downstream customers is allowed on the peer-peer link; traffic from providers or other peers are not allowed.

Certain exemplary embodiments can address the issue of quantifying incompleteness of the machine-determined Autonomous System-level topology based on the "no-valley" routing policy. As used herein, the phrase policy means a set of rules, typically in an "If X, then Y" format, defining and/or governing how network users, applications, systems, and/or devices can access and/or use network resources. As used herein, the phrase user means a person, organization, process, device, program, protocol, and/or system that uses a device, system, process, and/or service. Certain exemplary embodiments can utilize a heuristic to accurately identify customer-provider links in the Autonomous System topology, the rest of the machine-determined links can be considered peer links. Calling the current set of vantage points the "public view". Certain exemplary embodiments can utilize a heuristic, which enables identification of Autonomous Systems whose Autonomous System-level connectivity can be completely captured by the public view. Certain exemplary embodiments can provide quantitative results for the incompleteness of machine-determined Autonomous System-level topology.

Certain exemplary embodiments can identify, quantify, and/or understand the inherent limitations of the Internet Autonomous System maps inferred from publicly available datasets provided by RouteViews and RIPE-RIS. Calling the commonly used vantage points of RouteViews and RIPE-RIS the "public view," Certain exemplary embodiments can show that this public view (i) accounts for the full connectivity of all the Tier-1 Autonomous Systems, (ii) captures all customer-provider links in the Internet, provided that one includes historical data from the public view, and (iii) misses a large number of peer links, especially in the lower tiers of the Internet routing hierarchy. As used herein, the phrase Tier-1 Autonomous System (Tier-1 Internet Service Provider) means a United States Internet Service Provider that operates a high speed transcontinental network, which does not have any providers. Tier-1 Autonomous Systems are at the top of Internet Autonomous System hierarchy, and form the core of the global routing infrastructure and connect to each other to produce a fully meshed graph. There are approximately half a dozen such Systems in 2008. There is no real equivalent in Europe but such roles have largely been taken by national Post, Telegraph and Telecommunications entities.

Certain exemplary embodiments can quantify how much of the Autonomous System-level topological connectivity may be missing from the public view. Based on the no-valley routing policy, certain exemplary embodiments can utilize a heuristic to identify customer-provider links in the Autonomous System topology to classify Autonomous Systems into customer-provider relations. Since a customer Autonomous System can be able to machine-determine the Autonomous System links of its provider(s) over a long enough time period, by identifying those Autonomous Systems who have at least one customer Autonomous System that hosts a vantage point in the public view, the Autonomous Systems whose connectivity can be captured in the public view can be identified. As used herein, the phrase at least means not less than. As used herein, the phrase less than means having a measurably smaller magnitude and/or degree as compared to something else. As used herein, the phrase Autonomous System Link (Link) means a connection between two Autonomous Systems. The Autonomous Systems link can be a provider-customer link or a peer-peer link.

Obtained data shows that the public view can be capable of revealing the full connectivity of approximately 5% of all the Autonomous Systems, which includes approximately 77% of large ISPs, approximately 34% of small ISPs, and approximately 0.5% of stub Autonomous Systems. In certain exemplary embodiments, the public view can miss a large portion of Autonomous System links in the Internet topology; certain exemplary embodiments can quantify how much might be missing.

In certain exemplary embodiments, the part of the actual Autonomous System-level topology that can be largely uncovered by the public view can be the edge Autonomous Systems' connectivity, and the large number of edge Autonomous Systems can make it in-feasible to install vantage points in all of them, let alone a number of potential non-technical issues involved in doing so. As used herein, the phrase install means to connect and/or place in position and prepare for use. Edge connectivity can be the part of the topology that changes most because of aggressive public peering by Autonomous Systems, which can play a role in Internet topology evolution. As used herein, the phrase public peer means an Autonomous System connected to a given Autonomous System via public peering. As used herein, the phrase public peering means an Autonomous System communicative coupling such as at Internet Exchange Points (IXPs). Though an IXP provides physical connectivity among all participants, individual networks decide with whom to establish BGP peering. For example, one network might only peer with other participants in the same IXP. Not only can the incomplete part be hard to capture, it can also represents a moving target.

Faced with this dilemma when it comes to assessing the completeness of inferred Autonomous System maps of the Internet, certain exemplary embodiments can call for alternative approaches to inferring Autonomous System-level connectivity that relies less on the current use of vantage points (either active or passive), but can be more aware of the nature of the Autonomous Systems that can be involved in a business relationship in the sense of knowing their business model, economic health, geographic extent, carried traffic etc. Compared to largely Autonomous System-agnostic approaches, more Autonomous System-aware methods can more accurately capture key forces at work in the actual Autonomous System-level ecosystem. Certain exemplary embodiments can provide for measurement, inference, and modeling of Autonomous System topology.

Certain exemplary embodiments can utilize two types of data to infer Autonomous System relationships, classify Autonomous Systems, and/or infer Autonomous Systems' presence at IXPs. As used herein, the phrase presence means a physical and/or logical existence. As used herein, the phrase Internet Exchange Point (IXP) means a shared switching node interconnecting Autonomous Systems. As used herein, the phrase node—an information device coupled to a network. For example, the node can be a third-party maintained physical infrastructure that enables physical connectivity between member networks. IXPs can connect their members through a shared layer-2 switching fabric (or layer-2 cloud).

BGP Data:

Certain exemplary embodiments utilized Border Gateway Protocol (BGP) data from Routeviews and/or RIPE-RIS collected over a 7-month period from 2007, Jun. 1 to 2007, Dec. 31, what can be termed public view. FIG. 1 is a graph of an exemplary representation of the number of prefixes found in routing tables versus a monitor identifier. This data included BGP tables and updates from approximately 700 routers in approximately 400 Autonomous Systems, even though only about 100+ routers from each source have full tables as indicated by FIG. 1. Due to the overlap in covered Autonomous Systems between Routeviews and RIPE-RIS and to the fact that some Autonomous Systems have multiple monitors, the set of routers with full tables corresponded to only 126 Autonomous Systems. All Tier-1 Autonomous Systems were included in this set except for Autonomous System 209 (Qwest), for which there was a monitor in one of the customers. Even though there can be additional sources of BGP data such as route servers, looking glasses and the Internet Routing Registry, the amount of additional Autonomous System connectivity they uncover can be incremental so the were not used. Furthermore, these extra data sources can provide partial BGP tables (and no updates), and an accurate quantification of the machine-determined completeness can utilize vantage points with full routing tables. As used herein, the phrase quantification means a numerical determination and/or calculation. Certain exemplary embodiments can utilize Autonomous System topological data derived from traceroute measurements due to issues in converting router paths to Autonomous System paths.

IXP Data:

There can be a number of websites, such as Packet Clearing House (PCH), Peeringdb, and/or Euro-IX that maintain a list of IXPs worldwide and also provide a list of ISP participants in some IXPs. Though the list of IXP facilities can be close to be complete, the list of ISP participants at the different IXPs can be incomplete and/or outdated since it can be inputted by the ISPs on a voluntary basis. As used herein, the phrase input means a signal, data, and/or information provided to a processor, device, and/or system. As used herein, the phrase signal means information encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal can be synchronous, asynchronous, hard real-time, soft real-time, non-real time, continuously generated, continuously varying, analog, discretely generated, discretely varying, quantized, digital, continuously measured, and/or discretely measured, etc. Most IXPs publish the subnets they use in their layer-2 clouds. In certain exemplary embodiments, each IXP participant keeps reverse DNS entries for their assigned IP addresses inside the IXP subnet and/or no entries for unassigned addresses. As used herein, the phrase reverse domain name lookups means determining a domain name from an Internet Protocol address. Based on this, certain exemplary embodiments can infer IXP participants. The basic idea can be to do reverse DNS lookups on the IXP subnet IPs, and/or infer the participant ISPs from the returned domain names. Certain exemplary embodiments can define an (AS, IXP) pair as a presence. For example, if Autonomous System A and Autonomous System B peer at IXP X, there can be two presences: (A, X) and (B, X). From the aforementioned three data sources, certain exemplary embodiments can derive a total of 6,215 unique presences corresponding to 2,843 Autonomous Systems in 177 IXPs worldwide. As used herein, the phrase total means of, relating to, or constituting a whole. Table 1 shows the breakdown of the machine-determined presences.

TABLE 1

IXP membership data, December 2007.

| Presences (AS-IXP pairs) | Peeringdb | Euro-1X | PCH |
|---|---|---|---|
| Listed on source website | 2,552 | 2,203 | 862 |
| Inferred from reverse DNS | 3,043 | | 3,618 |
| Unique within the source | 4,442 | 2,203 | 3,968 |
| Total unique across all sources | | 6,215 | |

As used herein, the phrase convert means to transform, adapt, and/or change, such as from a first form to a second form. Certain exemplary embodiments can infer the business relationships between Autonomous Systems and/or provide method to classify different Autonomous Systems into classes.

In certain exemplary embodiments, monitors at the top of the routing hierarchy (i.e. Tier-1 monitors) can be able to reveal downstream provider-customer connectivity over time assuming routes follow a no-valley policy. As used herein, the phrase no-valley-and-prefer-customer policy means routing and/or communications rules that specify that an Autonomous System prefers a path announced by a customer over a path from a peer, prefers a path from a peer over that from a provider, and does not propagate the paths announced by a provider or peer to any other providers or peers. As used herein, the phrase assume means to assign and/or determine by default. This can be an important observation since, by definition, each non-Tier-1 Autonomous System can be a customer of (or downstream of) at least one Tier-1 Autonomous System, then provider-customer links in the Internet can be observed at the Tier-1 monitors over time. As used herein, the phrase observe means to ascertain and/or measure. This can be the basic idea of an Autonomous System relationship inference algorithm.

Certain exemplary embodiments can assume the set of Tier-1 Autonomous Systems are already known and/or are publicly available. By definition of Tier-1 Autonomous Systems, the links between Tier-1s can be peer links, and Tier-1 might not be a customer of any Autonomous Systems. Suppose a monitor at Tier-1 Autonomous System m reveals an Autonomous System-PATH m-$a_1$-$a_2$- . . . -$a_n$. The link m-$a_1$ can be either a provider-customer link, or a peer link since sometimes a Tier-1 might have a specially arranged peer relationship with a lower-tiered Autonomous System. However, according to no-valley policy, $a_1$-$a_2$, $a_2$-$a_3$, . . . , $a_{n-1}$-$a_n$ can be provider-customer links since a peer or provider route might not be propagated upstream from $a_1$ to m, therefore the segment $a_2$, . . . , $a_n$ can correspond to a customer route received by $a_1$. As used herein, the phrase receive means to gather, take, acquire, obtain, accept, get, and/or have bestowed upon. Certain exemplary embodiments can infer the relationship of m-$a_1$ since according to no-valley policy, if m-$a_1$ can be provider-customer link, this link should appear in the routes propagated from m to other Tier-1 Autonomous Systems, whose monitors will reveal this link; on the other hand, if m-$a_1$ can be a peer link, it might not be propagated to or revealed by monitors at other Tier-1 Autonomous Systems (other than m itself). As used herein, the phrase appear means to be visible to and/or testable by. As used herein, the phrase visible means a state of being viewable by a user. Given monitors in all but one Tier-1 Autonomous Systems, certain exemplary embodiments can accurately infer the relationship m-$a_1$ by looking at whether it can be revealed by Tier-1 Autonomous Systems other than m. Using above method, certain exemplary embodiments can find and label all the provider-customer links, while other links revealed by monitors can be then labeled as peer links.

Figure 2:
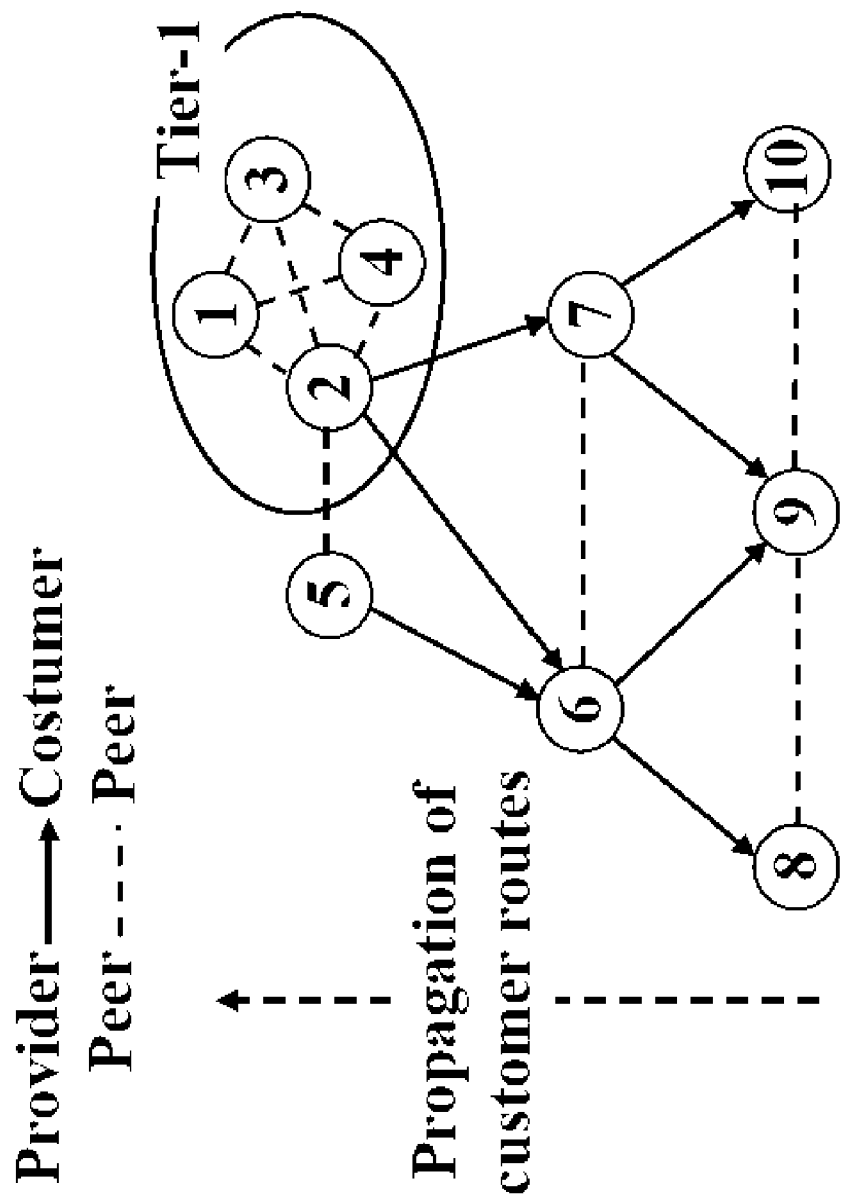
FIG. 2 is a block diagram of an exemplary embodiment of an Autonomous System and nodes coupled thereto.

FIG. 2 is a block diagram of an exemplary embodiment of an Autonomous System and nodes coupled thereto. An exemplary algorithm is illustrated in FIG. 2, where 1, 2, 3, and 4 can be known to be Tier-1s. As used herein, the phrase where means in a situation or position. Suppose Tier-1 Autonomous System 2 monitor reveals an ASPATH 2-5-6-8 and another ASPATH 2-7-9; while monitors at Tier-1 Autonomous System 4 reveals an ASPATH 4-2-7-9, but none of 1, 3, 4 reveals an ASPATH ending at 2-5-6-8. According to above algorithm, 5-6, 6-8, and 7-9 can be provider-customer links. 2-7 can be provider-customer link since it can be revealed by Tier-1s other than 2, while 2-5 can be peer link since it might not be revealed by any other Tier-1s. Furthermore, suppose Autonomous System 6 can be a monitor and it reveals link 6-7, and 6-7 might never be revealed by Tier-1s 1, 2, 3, or 4. Then this 6-7 can be a peer link according to certain exemplary embodiments.

From measurements of Tier-1 routes over the 7-month period, it was possible to infer a total of 70,698 provider-customer links. Some of these links were in routes that had a very short lifetime (less than 2 days). As used herein, the phrase lifetime means an elapsed time since generation and/or creation. These cases can be caused by BGP misconfigurations (e.g. route leakages) or prefix hijacks. As used herein, the phrase cause means to bring about, provoke, precipitate, produce, elicit, be the reason for, result in, and/or effect. After filtering all routes with a lifetime of less than 2 days, 5,239 links were excluded, ending up with a total of 65,459 provider-customer links. As used herein, the phrase filter means to eliminate undesired data, such as statistical outliers, irrelevant time periods, etc. As used herein, the phrase after means subsequent to.

Certain exemplary embodiments can utilize inferred provider-customer relations to classify Autonomous Systems in several functional types. This classification can be done based on degree or number of prefixes originated. However, the degree can be misleading since it includes a mix of providers, peers and customers in the count. As used herein, the phrase count means (n.) a number reached by counting and/or a defined quantity. (v.) to increment, typically by one and beginning at zero. Also, the number of prefixes originated might not be meaningful since the length of the prefixes can be different and the routes carried downstream might not be accounted. To overcome these limitations, certain exemplary embodiments can utilize the number of downstream customer Autonomous Systems instead (or "customer cone"), which were extracted from the routes gleaned over the 7-month period from the Tier-1 monitors.

Figure 3:
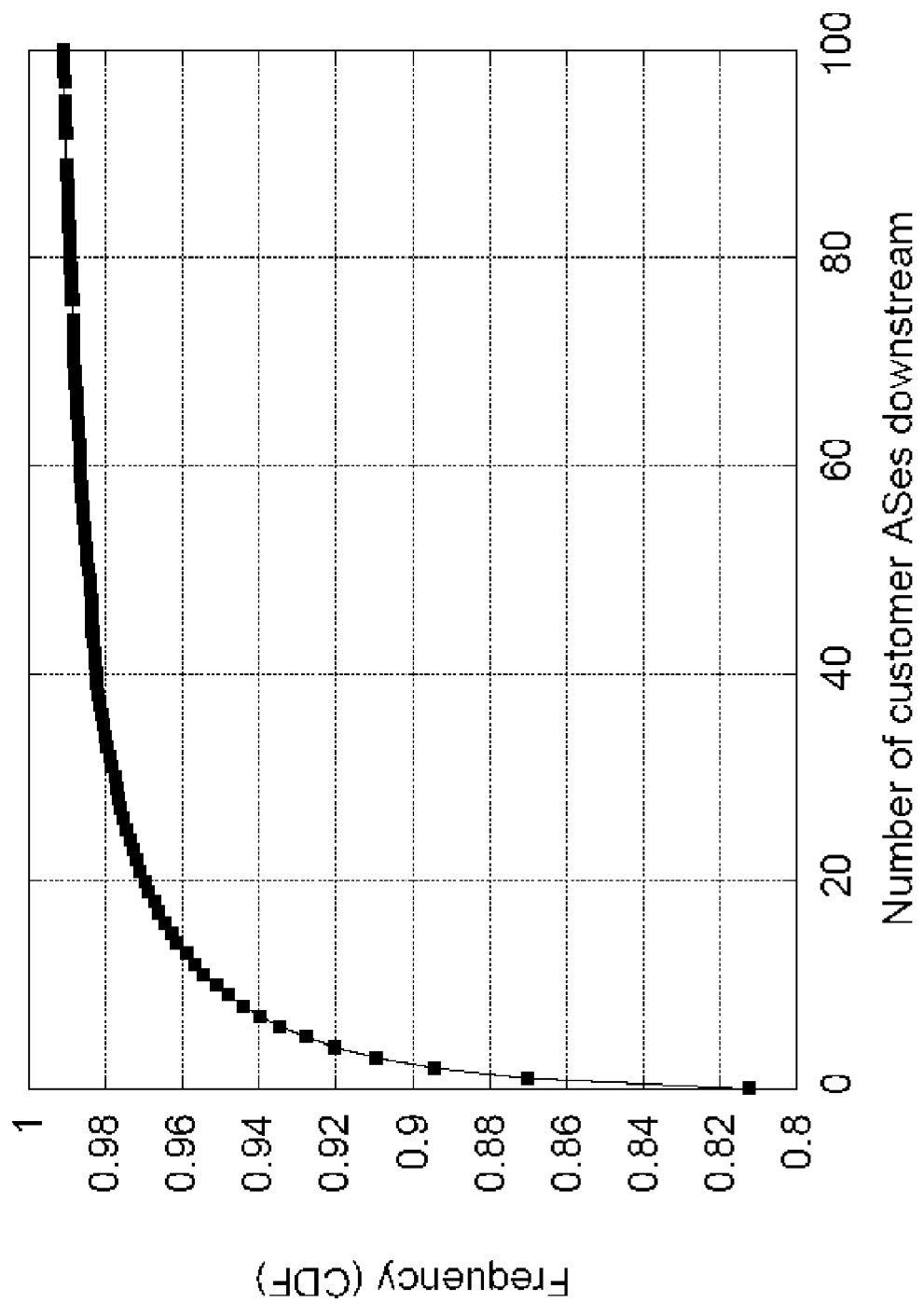
FIG. 3 is a graph of an exemplary representation of observed frequency versus a number of customer Autonomous Systems downstream.

FIG. 3 is a graph of an exemplary representation of observed frequency versus a number of customer Autonomous Systems downstream, which shows the distribution of the number of downstream customers per Autonomous System. Approximately 80% of the Autonomous Systems did not have any customers, and there can be a significant fraction of Autonomous Systems with a very small number of customers. As used herein, the phrase fraction means a ratio of a portion to a greater whole. As used herein, the phrase greater means larger and/or more than. Those Autonomous Systems with 4 or less customers can be labeled as stub, which can comprise approximately 92% of the Autonomous Systems. As used herein, the phrase label means (n.) an item used to identify something to assign a moniker to a thing. This should correspond to end networks, which either don't provide transit or have very limited transit to local customers, e.g. universities providing transit to small research facilities. Further, labels of small ISPs can be applied to Autonomous Systems, which have between 5 and 50 downstream customers, based on the knee of the distribution in FIG. 3. They corresponded to approximately 6% of the total determined Autonomous Systems. As used herein, the phrase further means in addition. The remaining Autonomous Systems in the long tail, which might not be known as Tier-1s, can be labeled as large ISPs. Table 3 shows the number of Autonomous Systems in each class. The sensitivity of the classification thresholds were analyzed by changing them of some delta, but did not notice significant difference in the end result.

Certain exemplary embodiments can quantify some aspects of the completeness of the Autonomous System topology as observed by the public view. A monitor can uncover upstream connectivity over time. For example, in FIG. 2, a monitor at Autonomous System 7 can receive routes from upstream providers that can carry the peer links existing upstream, in this case the links 2-1, 2-3, 2-4 and 2-5 (in addition to the provider-customer links existing upstream). Therefore, by starting at Autonomous System 7 and following provider-customer links upstream, certain exemplary embodiments can pass through the Autonomous Systems that can be covered by Autonomous System 7, in the sense that Autonomous System 7 can be able to reveal all their connectivity. In FIG. 2, the Autonomous Systems covered by Autonomous System 7 can be just Autonomous System 2, but Autonomous System 6 can cover both Autonomous System 5 and Autonomous System 2.

Results obtained by applying this reasoning to the monitored Autonomous Systems of public view are shown in Table 2. For comparison purposes, we included both the set of monitors with full tables and full plus partial tables, but end result can be very similar. The most striking observation can be that the current set of monitors in public view can be able to cover approximately 4% of the total number of Autonomous Systems, which indicates that a view used by the research community might miss certain of the peer connectivity in the network happening within the remaining 96% of the Autonomous Systems.

TABLE 2

Coverage of BGP monitors.

| Parameter | Full tables | Full + partial tables |
| --- | --- | --- |
| No. monitored ASes | 121 | 411 |
| No. ASes | 1,101/28,486 ≃ 4% | 1,552/28,486 ≃ 5% |
| Prefixes | 52,861/236,237 ≃ 22% | 60,987/236,237 ≃ 26% |
| Traffic | ≃22% | ≃25% |

Certain exemplary embodiments can extend this analysis to prefixes and traffic volume in the following way. Assume Autonomous System i originates Pi prefixes, then the prefixes can be added up for Autonomous Systems covered by Autonomous System i to produce the total number of prefixes covered by Autonomous System i: $\Sigma_{i \in cov} P_i$ with our monitor set, we can be able cover the Autonomous System links used in all the routes to these prefixes. According to Table 2, at least 22% of the prefixes can be reachable through Autonomous System links already covered. This number should be taken as a lower bound, since there can be prefixes not covered that can be reached through already covered routes.

In order to extend this analysis to traffic, proprietary Netflow data from a Tier-1 backbone was used. As used herein, the phrase backbone network means a "transit" network, often made up of long-distance telephone trunk lines and/or other wired and/or wireless links such as microwave and satellite links, adapted for transmitting large amounts of data simultaneously between host computer systems connected to the Internet. Normal communicated data typically neither originates nor terminates in a backbone network. The total fraction of traffic received by the Pi prefixes originated by Autonomous System i can be denoted as $f_i$ (which can be extracted from Netflow data), which can be a measure of popularity of AS i. Then the fraction of covered traffic can be given by $\Sigma_{i \in cov} f_i$, which can be approximately 22% according to Table 2. Again, this can be viewed as a lower bound, in the sense that at least 22% of the traffic in the network follows Autonomous System links already covered by the monitor set.

Finally, certain exemplary embodiments can perform an analysis of the covered Autonomous Systems in terms of their classes, which can be shown in Table 3. The column "Covered Autonomous Systems-aggregated" refers to the total fraction of covered Autonomous Systems in each class, whereas the column "Covered Autonomous Systems-by covering type" refers to the number of Autonomous Systems covered by the monitors in each class. For instance, approximately 77.3% of the large ISPs can be covered by monitors, and monitors in large ISPs cover 954 total Autonomous Systems. The numbers in the table indicate that Tier-1s can be covered, large ISPs can be mostly covered, small ISPs remain largely uncovered (approximately 34.4%), and stubs can be almost completely uncovered (approximately 99.5%). This can be because most of the monitors reside in the core of the network, and in order to cover a stub, we would need to place a monitor in the stub or in any of its downstreams which can be unfeasible to do at the scale of the Internet due to the very large number of stubs in the network.

TABLE 3

Coverage of BGP monitors for different network types.

| Type | Monitored | | Covered ASes | |
| --- | --- | --- | --- | --- |
| | ASes | ASes | aggregated | by covering type |
| Tier-1 | 9 | 8 | 9 (100%) | 8 |
| Large ISP | 436 | 45 | 337 (77.3%) | 954 |
| Small ISP | 1,829 | 36 | 629 (34.4%) | 269 |
| Stubs | 26,209 | 37 | 126 (0.5%) | 160 |

Figure 4:
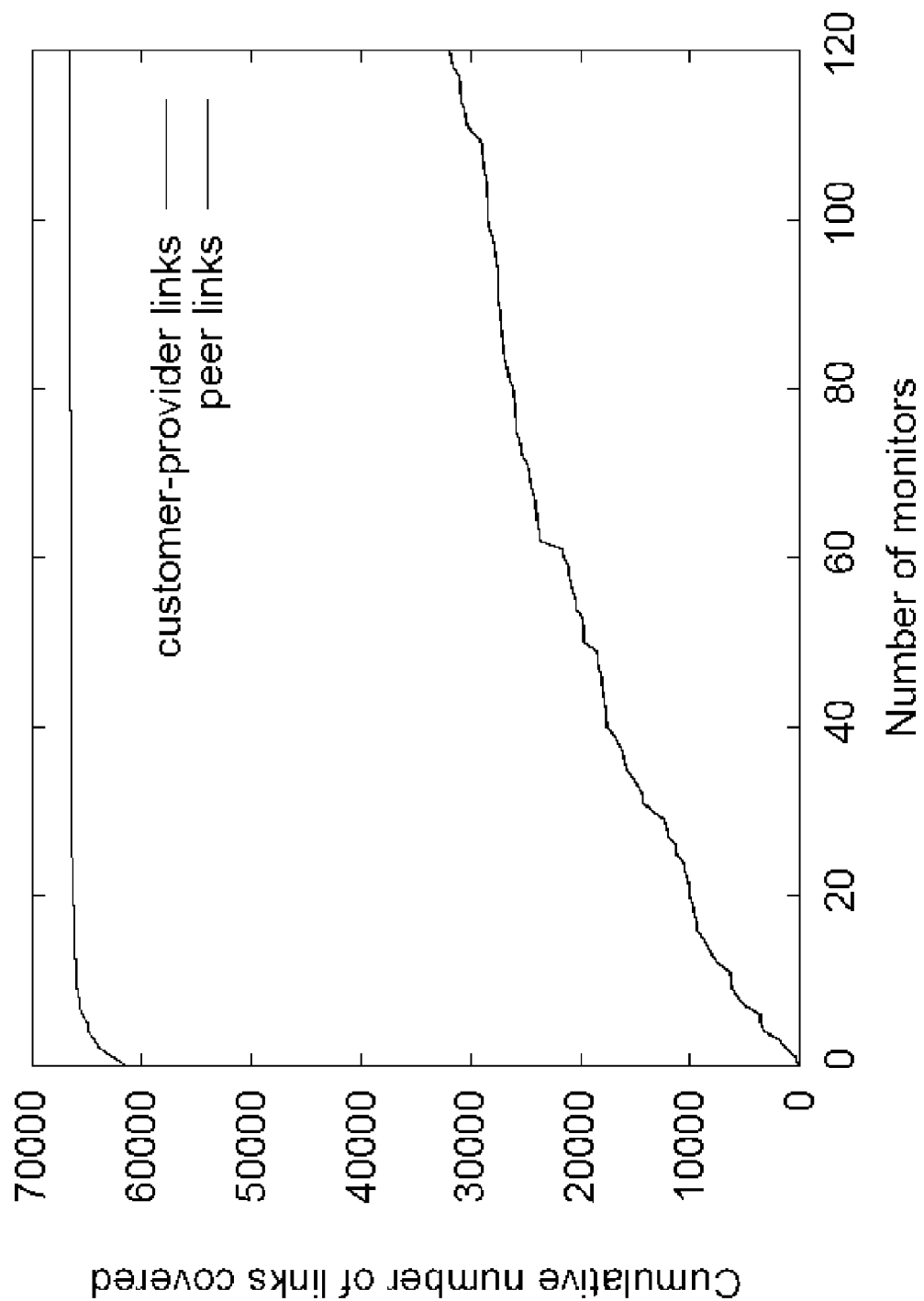
FIG. 4 is a graph of an exemplary representation of links covered versus a number monitors.

Certain exemplary embodiments can analyze how complete the view of the current set of public monitors can be in terms of covered Autonomous Systems, prefixes, and traffic. Certain exemplary embodiments can establish an upper bound on the number of peer links missing from observation. As used herein, the phrase upper bound means in a highest limit of an extent. FIG. 4 is a graph of an exemplary representation of links covered versus a number monitors, which shows the cumulative number of unique customer-provider and peer links captured by the monitors with full tables. The monitors can be ordered randomly. We can clearly observe that customer-provider links can be covered after a few monitors. If the first monitors were Tier 1 monitors, they would be covered quickly. However, for peer links, there can be a steady increase as more monitors can be added, meaning that each monitor can reveal additional new peer links that were invisible to the set of previous monitors. The challenge now lies in estimating how many peer links remain invisible after adding the $n^{th}$ monitor, which can be estimated by the following model. As used herein, the phrase estimate means (n.) a calculated value approximating an actual value. (v.) To calculate and/or determine approximately and/or tentatively.

Assume there are totally N Autonomous Systems in the Internet and each can potentially have a monitor providing BGP routing tables and updates. Now suppose we keep collecting peer links by looking at these monitors, one after another in a random order, and we want to know how many peer links can be revealed after looking at n monitors. The number of visible peer links after observing n monitors, V (n), can be given by:

$$V(n) = \sum_i p_i = \sum_i \left(1 - \frac{\binom{N-S_i}{n}}{\binom{N}{n}}\right) \quad (1)$$

where $p_i(n)$ is the probability to discover a specific link i after using n monitors. $p_i(n)$ is given by the hypergeometric distribution, where $S_i$ is the number of monitors that use link i in their routing tables, and $$\frac{\binom{N-S_i}{n}}{\binom{N}{n}}$$

is the probability that link i remains invisible after looking at n monitors. As used herein, the phrase probability means a quantitative expression of a likelihood of an occurrence.

Figure 5:
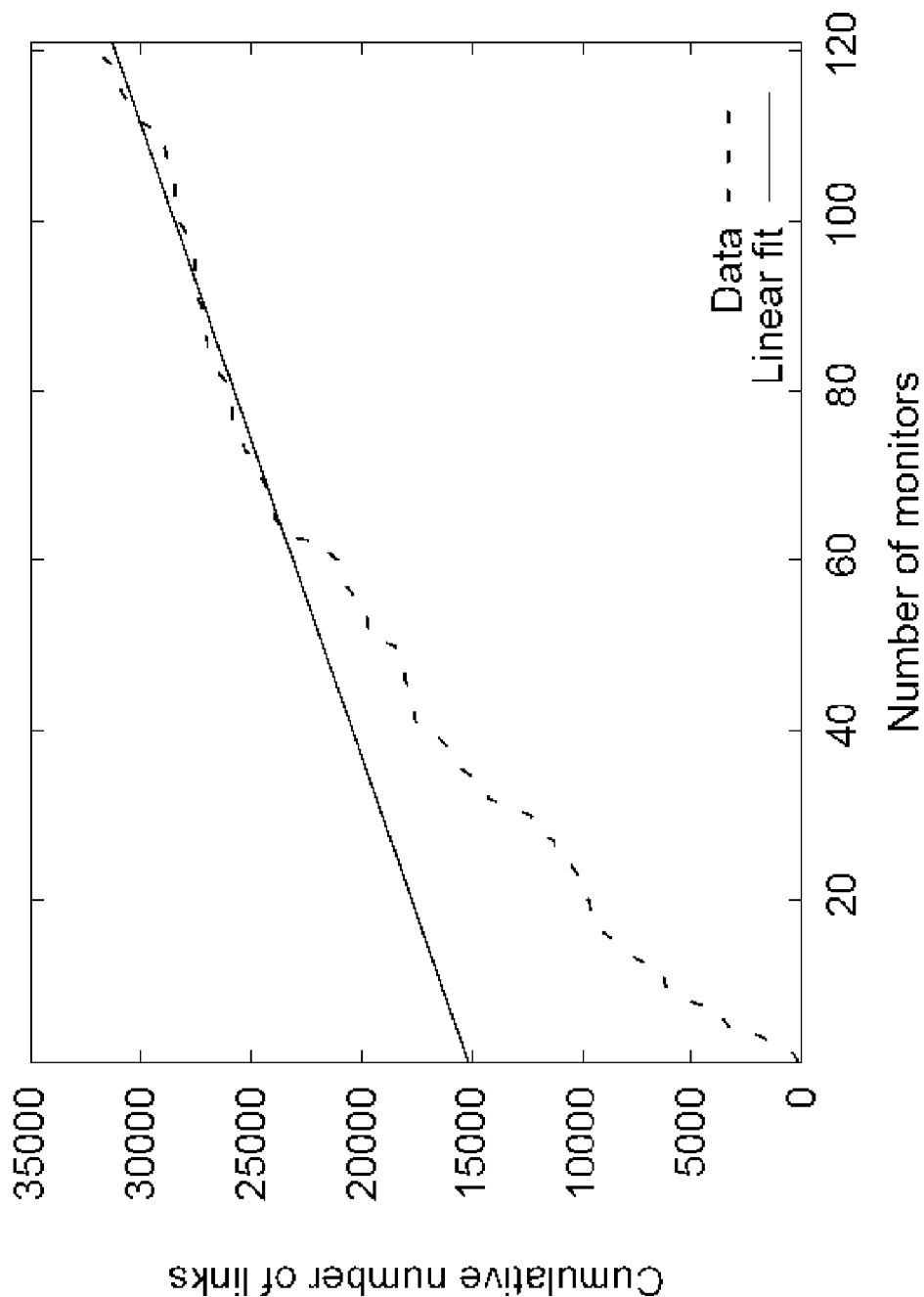
FIG. 5 is a graph of an exemplary representation of a number of links versus a number monitors.

FIG. 5 is a graph of an exemplary representation of a number of links versus a number monitors, which reproduces the curve of peer links of FIG. 4. It shows that the later part of the curve can be approximated by linear increase. Assuming n<<N, the hypergeometric distribution in Equation 1 can be approximated by a binomial distribution with parameter $$s_i = \frac{S_i}{N}.$$

We term s j the scope of link i. As used herein, the phrase scope means a range of links of an Autonomous System. Therefore, we would have:

$$V(n) \simeq \sum_i (1-(1-s_i)^n) \simeq L - \sum_i (1-s_i)^n \quad (2)$$

where L is the total number of peer links in the Internet. As used herein, the phrase equation means a determinable mathematical expression. Denote $H(n)=\Sigma_i(1-s_i)^n$ the number of hidden links after using n monitors. Note that for a sufficiently large number of monitors n, the number of hidden links H(n) can be well approximated by considering only the contribution of very small scope links since the links with high scope can have been observed already. Assume these invisible links have a very small scope, $s_i=\beta$, then we have:

$$H(n) \simeq A(1-\beta)^n \simeq A(1-n\beta)$$

where A is the total number of links with very small scope. Therefore, we can rewrite Equation 2 as:

$$V(n) \simeq L-A(1-n\beta) \simeq (L-A)+A\beta n$$

which can explain the linear increase of the latter part of the curve in FIG. 5. The parameters (L−A) and Aβ can be estimated by curve fitting the measured data in FIG. 5. The parameter β quantifies the chances of a monitor to reveal an invisible peer link (after looking into a large number of monitors). In the worst case, for a peer link between two stubs, the link can be revealed by the two incident monitors: β=2/N. In the best case $\beta \simeq 1/n$, meaning that the link can be covered by one of the existing monitors. Therefore, 2/N<β<1/n.

Figure 6:
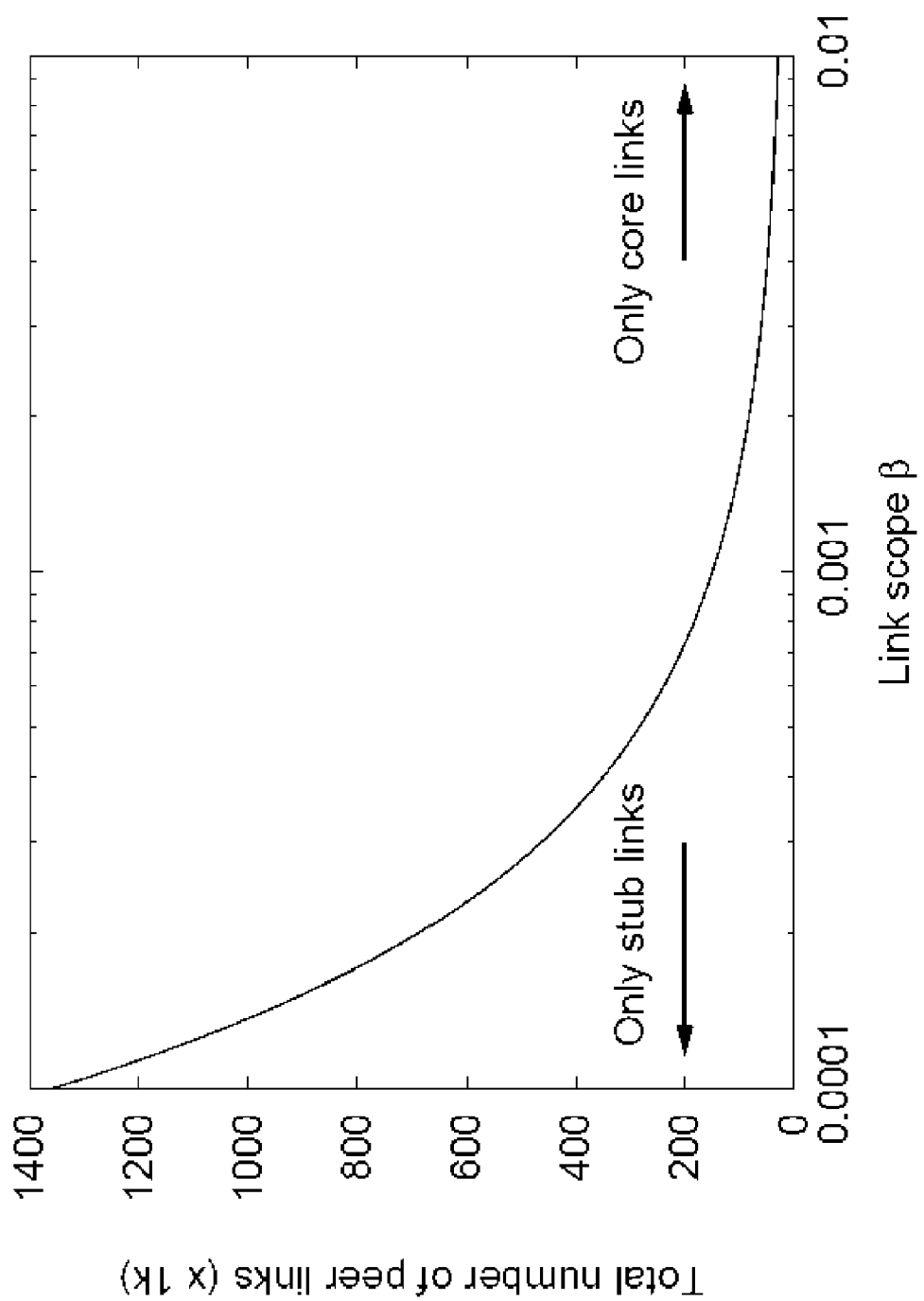
FIG. 6 is a graph of an exemplary representation of total number of peer links versus link scope.

FIG. 6 is a graph of an exemplary representation of total number of peer links versus link scope, which shows a projection of the number of total peer links L depending on the value of β. As used herein, the phrase project means to calculate, estimate, or predict On the left side of the curve, remaining peer links can be at the edge of network between stub Autonomous Systems. On the right side, peer links can be in the core and already captured by monitors. The reality can be somewhere in the middle, e.g. between 100 k and 400 k links Comparing these values with the ~30 k; peer links captured by the current monitors, the public view might be estimated as missing roughly up to 90% of the total peer connectivity.

Since majority of the peer links can be missing from public view and it can be impractical to install a BGP monitor in every Autonomous System in the network, new methods can be utilized to fill in the missing peer links to achieve a complete and/or accurate Autonomous System level map. Certain exemplary embodiments can focus on large content networks in this paper as peer links can be missing from public view thus certain exemplary embodiments can focus on a challenging special case. As used herein, the phrase content means substance and/or substantive portion of a stored and/or written work. Certain exemplary embodiments can have access to the ground truth for one large content provider C so that heuristics can be evaluated against the ground truth at C.

Peering can be implemented in two ways: private peering and public peering. As used herein, the phrase private peering means a communicative coupling between Autonomous System with a dedicated connection between two networks, which provides dedicated bandwidth. A private peering can be a dedicated router-to-router layer-2 connection between two networks. Private peering can provide dedicated bandwidth, can be easier to troubleshoot problems, but has higher cost. Certain exemplary embodiments can migrate private peerings to public peerings since the latter costs less and its bandwidth capacity can be increasing. Public peering can happen at the Internet Exchange Points (IXPs), which can be third-party maintained physical infrastructures that enable physical connectivity between their member networks. IXPs can connect their members through a common layer-2 switching fabric (or layer-2 cloud). As used herein, the phrase common means shared and/or same. Though IXPs can enable physical connectivity between all participants, whether to establish BGP peering sessions on top of the physical connectivity can be up to individual networks. It can be possible that one network may only peer with some of the other participants in the same IXP.

Large content networks can be a special case of networks that can engage in heavy public peering at IXPs. These networks can have a small number of downstream customers and a small incoming/outgoing traffic ratio. Since their main business can be not to provide transit but rather to enable access to their content, these networks can have a very open peering policy, peering with whoever wants to peer with them. This policy can have two benefits, first by having direct connection with peers they can speed up the content delivery and second they can save on traffic sent upstream (reducing their Internet access cost).

Figure 7:
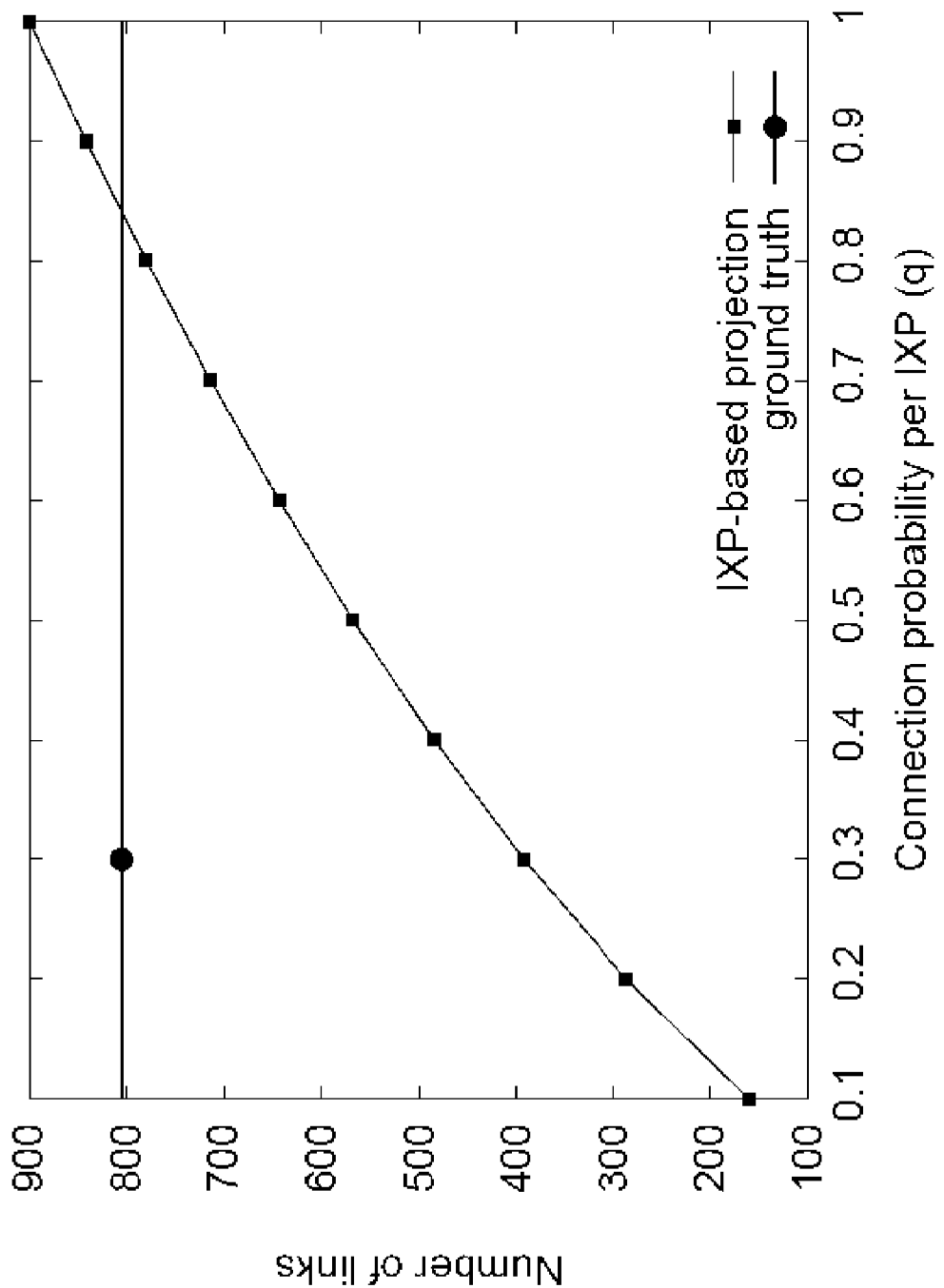
FIG. 7 is a graph of an exemplary representation of a number of links versus a connection probability per IXP.

Certain exemplary embodiments can provide a method to infer the public peers of a given content provider C, for which ground truth information was obtained after conversations with its network operators, who also disclosed that C peers with approximately 80-90% of the participants at each IXP. Certain exemplary embodiments can assume that in each IXP where C has presence, it connects to a fixed fraction q of the networks also collocated at that IXP, i.e. if C has n common locations with another network X, then the chances that C and X can be connected in at least one IXP can be given by $1-(1-q)^n$. As used herein, the phrase fixed means a stable and/or unalterable form. More generally, the expected number of peer Autonomous Systems of C, Pc can be given by $P_C = \Sigma(1-(1-q)^{n_i})$, where i represents networks that have at least one common presence with C, and $n_i$ is the number of IXPs where both C and i have presence. As used herein, the phrase expected means anticipated. As used herein, the phrase collocated means physically and/or logically present at a same site. In the IXP data set, C can have presence in 30 IXPs worldwide, which can be very close to the number that was disclosed to us by the operators of C. FIG. 7 is a graph of an exemplary representation of a number of links versus a connection probability per IXP. Based on the IXP data and the above model, the projected number of peer Autonomous Systems for C was plotted in FIG. 7, where the ground truth is also shown. This projection, given the q=80-90% for C, can be very close to the ground truth.

With this in mind, and given the open peering policy of the content networks, a feasible approach to fill the missing connectivity for large content providers can be to simply assume they can be connected to the participants that share at least one common IXP with them. If we follow this approach for the special case of C, accuracy can be approximately 85%, i.e. about 15% of the peers would be false positives.

Certain exemplary embodiments can attempt to quantify how many Autonomous System links might be missing from an Internet topology. Through the use of a heuristic, certain exemplary embodiments can show that the public view can be capable of capturing the full connectivity of only approximately 5% of all the Autonomous Systems. However, the public view can be capable of capturing the customer-provider Autonomous System links in the topology over time. The bulk of the potentially missing connectivity involves peer links below the line of sight of the public view, and certain exemplary embodiments can provide a model that provides the upper bound on the number of potentially missing peer links.

Figure 8:
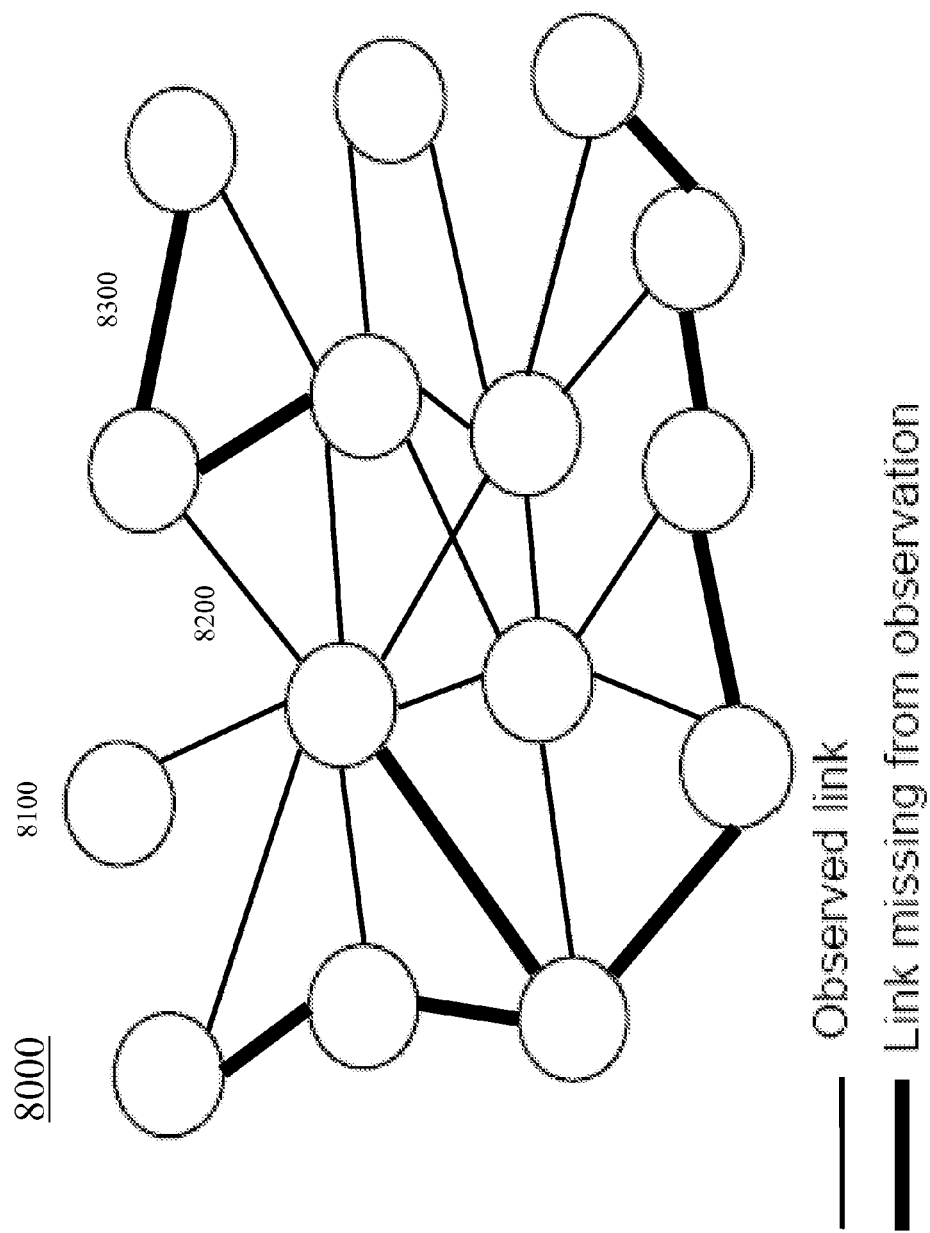
FIG. 8 is a block diagram of an exemplary embodiment of interconnected autonomous systems 8000.

FIG. 8 is a block diagram of an exemplary embodiment of interconnected Autonomous Systems 8000, which can comprise a plurality of Autonomous Systems 8100. Each of plurality of Autonomous Systems 8100 can be interconnected to other Autonomous Systems by one or more links. Links of system 8000 can comprise a first set of links 8200, which can be observable by network monitors in accordance with certain exemplary embodiments. Links of system 8000 can comprise a second set of links 8300, which can be substantially not observable by the network monitors. Certain exemplary embodiments can be adapted to quantify a size of second set of links 8300 and/or Autonomous Systems coupled thereto. As used herein, the phrase size means physical dimensions, proportions, magnitude, amount, and/or extent of an entity. As used herein, the phrase adapted to means suitable, fit, and/or capable of performing a specified function. Certain exemplary embodiments can be adapted to quantify and/or establish an upper bound of a count of Autonomous Systems communicatively coupled to the Internet.

In certain exemplary embodiments, Autonomous Systems can form peer relationships. Autonomous System peering can be realized through either private peering or public peering. As used herein, the phrase Autonomous System peering (peering) means configuring connections between two Autonomous Systems. Autonomous System peering can be realized through either private peering or public peering. As used herein, the phrase configure means to design, arrange, set up, shape, and/or make suitable and/or fit for a specific purpose. Peering can be delicate and/or important in inter-domain connectivity. A Network can have incentives to peer with other networks to reduce the traffic sent to its providers, hence saving operational costs. But, other considerations can apply to peering. For ISPs, besides additional equipment and management cost, ISPs might not want to peer with potential customers. Therefore ISPs can be selective in choosing their peers. Common criteria include number of common locations, ratio of inbound and outbound traffic, and certain requirements on prefix announcements. Content networks can peer with other networks to bypass providers. Certain content networks can have an open peering policy and peer with a large number of other networks.

Figure 9:
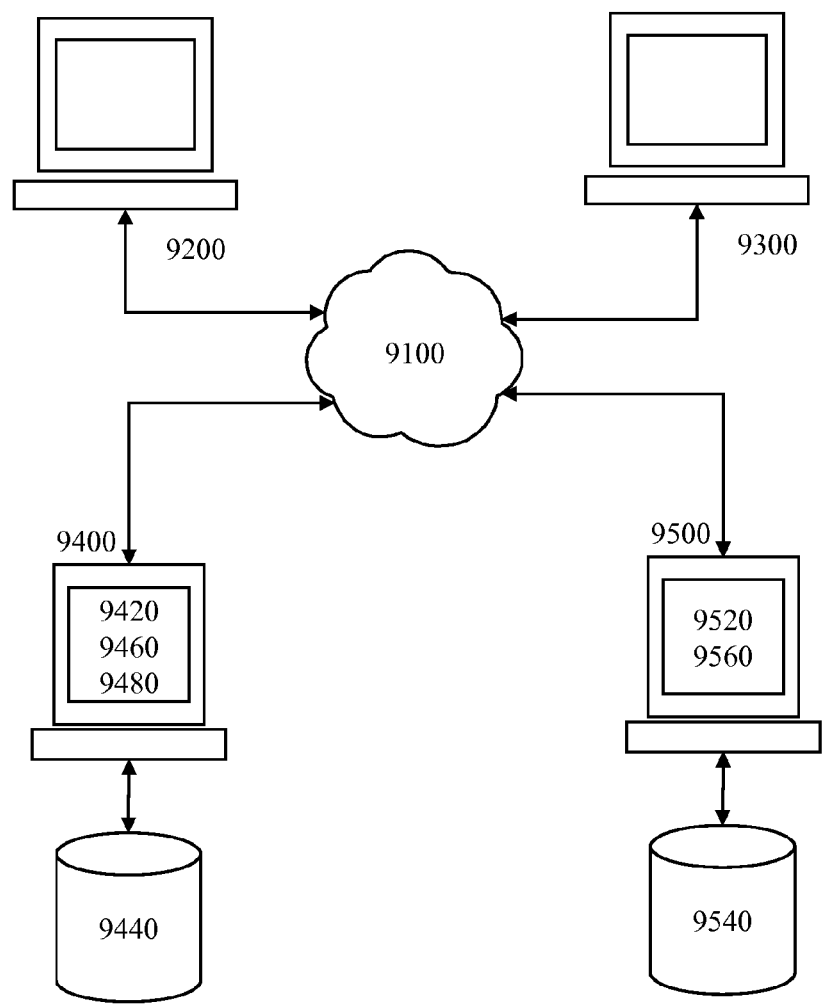
FIG. 9 is a block diagram of an exemplary embodiment of a system 9000.

FIG. 9 is a block diagram of an exemplary embodiment of a system 9000, which can comprise a network 9100, a first server 9400, and a second server 9500. In certain exemplary embodiments, network 9100 can be an Autonomous System that is communicatively coupled to other Autonomous Systems, such as the interconnected Autonomous Systems 8000 of FIG. 8. First server 9400 and/or second server 9500 can be adapted to provide services, such as analyses of Autonomous Systems, to a plurality of clients and/or client devices, such as a first information device 9200 and/or a second information device 9300. First server 9400 can comprise a user interface 9420, a user program 9460, and a processor 9480. Second server 9500 can comprise a user interface 9520 and a user program 9560. Each of user program 9460 and user program 9560 can be adapted to quantify completeness of a topology of Autonomous Systems of the Internet. Each of user interface 9420 and user interface 9520 can be adapted to render information regarding completeness of the topology of the Internet. As used herein, the phrase render means to display, annunciate, speak, print, and/or otherwise make perceptible to a human, for example as data, commands, text, graphics, audio, video, animation, and/or hyperlinks, etc., such as via any visual, audio, and/or haptic mechanism, such as via a display, monitor, printer, electric paper, ocular implant, cochlear implant, speaker, etc. As used herein, the phrase interface means (n) a boundary across which two independent systems meet and act on and/or communicate with each other. (v) to connect with and/or interact with by way of an interface. As used herein, the phrase Internet means an interconnected global collection of networks that connect information devices.

Processor 9480 can be adapted to, based upon a quantified completeness of a machine-determined topology of an interconnected set of Autonomous Systems of the Internet, automatically render an identity of a telecommunications customer that has been automatically determined to be leaving a telecommunications provider. As used herein, the phrase based upon means determined in consideration of and/or derived from. As used herein, the phrase automatically means acting and/or operating in a manner essentially independent of external human influence and/or control. For example, an automatic light switch can turn on upon "seeing" a person in its view, without the person manually operating the light switch. The quantified completeness of the machine-determined topology can be determined via a no-valley and prefer customer routing policy. Peer links in the machine-determined topology can be automatically identified as links that appear in routes propagated from a single Tier-1 Autonomous System. An upper bound estimate of a number of potentially missing peer-peer links in the machine-determined topology can be automatically rendered at the user interface.

Figure 10:
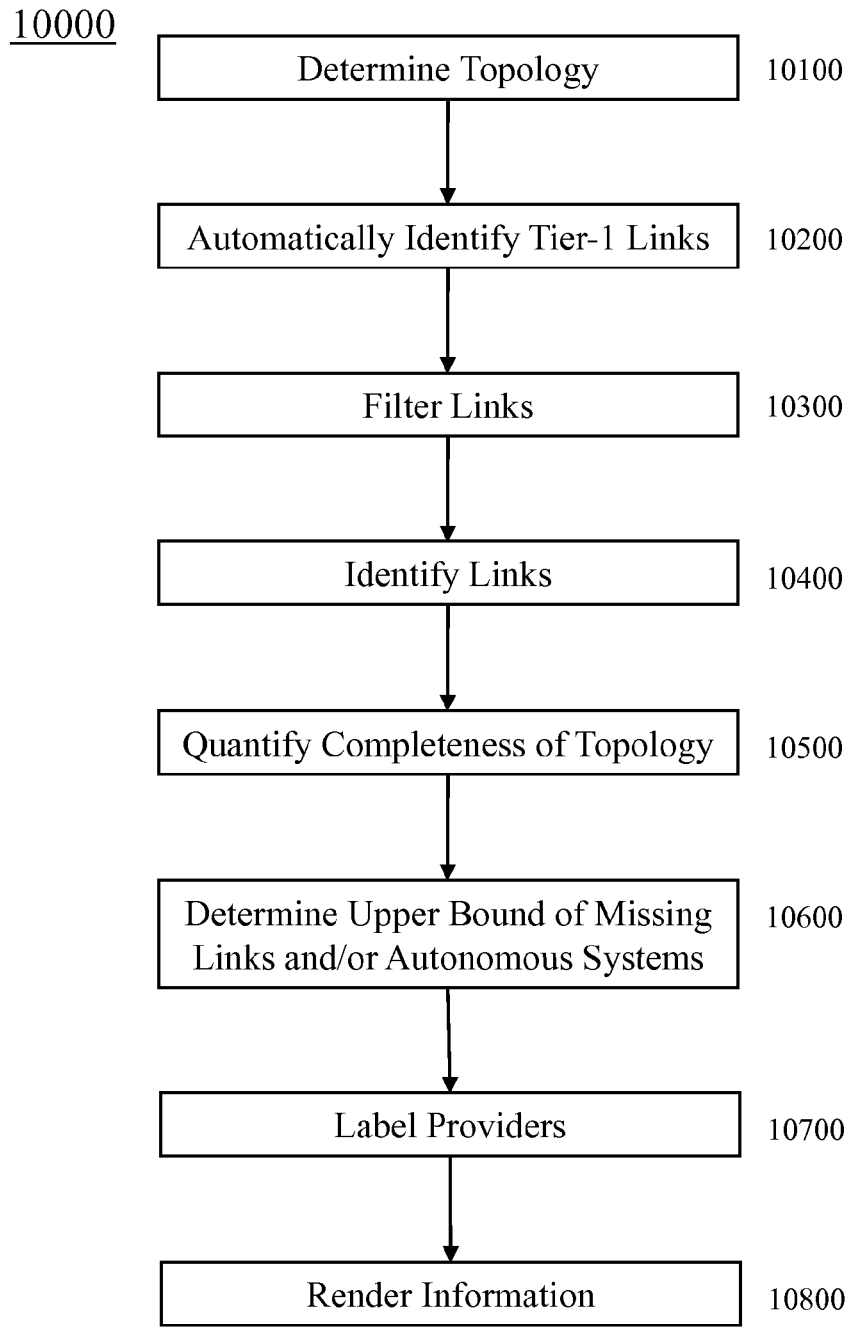
FIG. 10 is a flowchart of an exemplary embodiment of a method 10000.

FIG. 10 is a flowchart of an exemplary embodiment of a method 10000. As used herein, the phrase method means one or more acts that are performed upon subject matter to be transformed to a different state or thing and/or are tied to a particular apparatus, said one or more acts not a fundamental principal and not pre-empting all uses of a fundamental principal. Any set and/or subset of activities of method 10000 can be implemented automatically. As used herein, the phrase activity means an action, act, deed, function, step, and/or process and/or a portion thereof. Any set or subset of activities of method 10000 can be carried out via machine-implementable instructions stored on a machine-readable medium. As used herein, the phrase instructions means directions, which can be implemented as firmware and/or software, the directions adapted to perform a particular operation or function. As used herein, the phrase machine-implementable instructions means directions adapted to cause a machine, such as an information device, to perform one or more particular activities, operations, and/or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software. As used herein, the phrase machine-readable means capable of being discerned by an information device. As used herein, the phrase machine-readable medium means a physical structure from which a machine, such as an information device, computer, microprocessor, and/or controller, etc., can obtain and/or store data, information, and/or instructions. Examples include memories, punch cards, and/or optically-readable forms, etc. As used herein, the phrase perceptible means capable of being perceived by the human senses. As used herein, the phrase physical means tangible, real, and/or actual. As used herein, the phrase physically means existing, happening, occurring, acting, and/or operating in a manner that is tangible, real, and/or actual. As used herein, the phrase transform means to change in measurable: form, appearance, nature, and/or character.

At activity 10100, a topology of the Internet can be determined. The topology of the Internet can comprise an interconnected set of Autonomous Systems. As used herein, the phrase interconnect means to communicatively couple. For example, via RouteViews and RIPE-Routing Information Service, the topology can be automatically machine-determined. A set of rules can implement and/or follows an assumption that the machine-determined topology comprises all links between Tier-1 Autonomous Systems in the Internet.

At activity 10200, Tier-1 links of the topology can be automatically identified. For example, via the no-valley and prefer customer routing policy, a set of links can be automatically identified that appear in routes propagated from a plurality of Tier-1 Autonomous Systems to monitors as provider-customer links in the machine-determined topology.

At activity 10300, links can be filtered from the topology. For example, via the no-valley and prefer customer routing policy, links can be filtered from the machine-determined topology that have been determined to have a lifetime of less than a predetermined time period, such as two days. As used herein, the phrase two days means approximately forty eight hours. As used herein, the phrase predetermined means determine, decide, or establish in advance.

At activity 10400, links can be identified. Provider-customer links in the machine-determined topology can be automatically identified as links that only appear in routes propagated from a single Tier-1 Autonomous System. Certain exemplary embodiments can automatically designate identified links as peer-peer links that are not designated as provider-customer or Tier-1-Tier-1 links. As used herein, the phrase designate means to name and/or assign.

At activity 10500, a completeness of the topology can be quantified. The quantified completeness of the machine-determined topology can be determined via a no-valley and prefer customer routing policy. In certain exemplary embodiments, based upon provider-customer links, and the peer-peer links, the completeness of the machine-determined topology can be automatically quantified. Based upon reverse Domain Name System lookups, a count of public peers of an Autonomous System can be automatically inferred in the machine-determined topology. In certain exemplary embodiments, an expected count of peer Autonomous Systems automatically can be determined via an equation:

$$P_C = \Sigma_i (1 - (1-q)^{n_i})$$

where:
C is a content provider;
$P_C$ is the expected count of peer Autonomous Systems to the content provider;
i represents all networks that have at least one common presence with the content provider;

q is a fixed fraction of networks collocated at an Internet Exchange Point (IXP) with the content provider; and n is a count of IXPs where both C and i have presence At activity 10600, an upper bound of missing links and/or Autonomous Systems can be determined. For example, based upon an inferred count of public peers of a content provider, an upper bound of peer-peer links missing from the machine-determined topology can be automatically determined. An upper bound of peer-peer links missing from the machine-determined topology can be automatically determined via an equation:

$$V(n) \approx L - A(1-n\beta) \approx (L-A) + A\beta n$$

where:

n is a count of monitors;

V(n) is a count of visible peer-peer links after observing n monitors;

L is a total count of peer-peer links in the Internet;

β is a size of a small scope; and

A is a total count of links having the small scope.

At activity 10700, providers can be categorized and/or labeled. Based upon a determination that an Autonomous System has less than four customers, the Autonomous System can be labeled as a stub Autonomous System. Based upon a determination that an Autonomous System has between five and ninety customers, the Autonomous System can be labeled as a small Internet Service Provider. As used herein, the phrase determination means an act of making or arriving at a decision. Based upon a determination that an Autonomous System has greater than ninety customers, and is not a Tier-1 Autonomous System, the Autonomous System can be labeled as a large Internet Service Provider.

At activity 10800, information regarding the Autonomous Systems can be rendered at a user interface. For example, based upon a quantified completeness of the machine-determined topology of the Internet, at a user interface of an information device, a determined identity of a customer to which telecommunications products will be offered can be automatically rendered. An upper bound estimate of a number of potentially missing peer-peer links in the machine-determined topology can be automatically rendered at the user interface.

Figure 11:
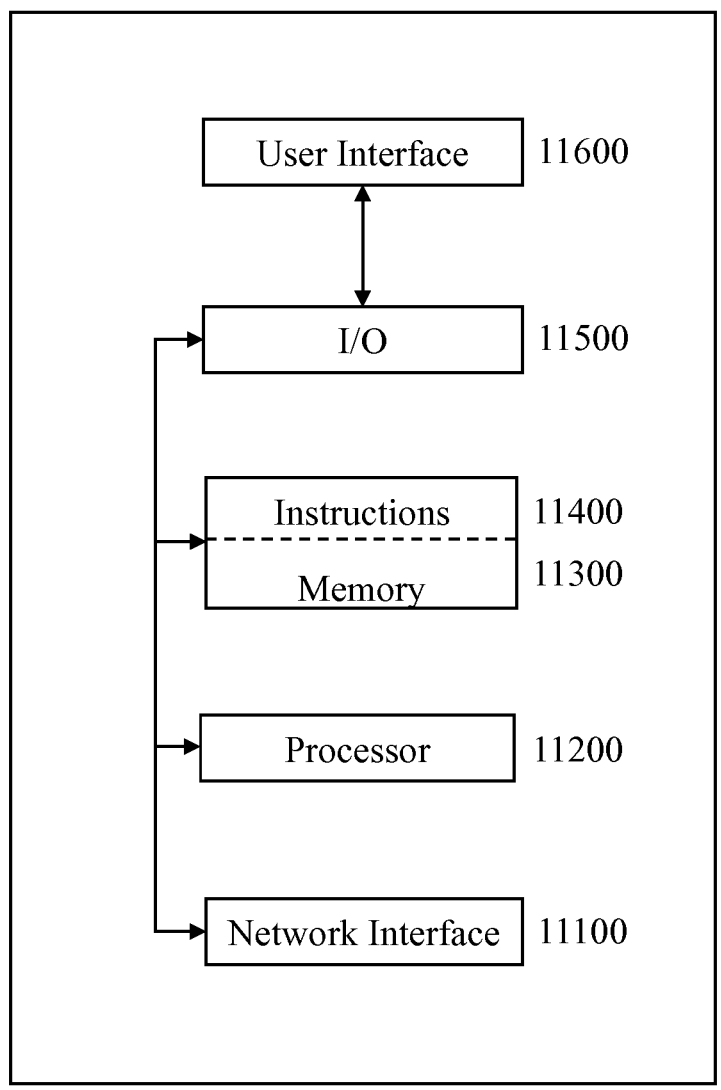
FIG. 11 is a block diagram of an exemplary embodiment of an information device 11000.

FIG. 11 is a block diagram of an exemplary embodiment of an information device 11000, which in certain operative embodiments can comprise, for example, first server 9400, second server 9500, first information device 9200 and/or second information device 9300 of FIG. 9. Information device 11000 can comprise any of numerous circuits and/or components, such as for example, one or more network interfaces 11100, one or more processors 11200, one or more memories 11300 containing instructions 11400, one or more input/output (I/O) devices 11500, and/or one or more user interfaces 11600 coupled to I/O device 11500, etc. As used herein, the phrase circuit means an electrically conductive pathway and/or a communications connection established across two or more switching devices comprised by a network and between corresponding end systems connected to, but not comprised by the network. As used herein, the phrase output means (n) something produced and/or generated; data produced by an information device executing machine-readable instructions; and/or the energy, power, work, signal, and/or information produced by a system. (v) to provide, produce, manufacture, and/or generate.

In certain exemplary embodiments, via one or more user interfaces 11600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein. As used herein, the phrase request means (v.) to express a need and/or desire for; to inquire and/or ask for. (n.) that which communicates an expression of desire and/or that which is asked for. As used herein, the phrase create means to make, form, produce, generate, bring into being, and/or cause to exist. As used herein, the phrase generate means to create, produce, render, give rise to, and/or bring into existence.

As used herein, the phrase memory device means an apparatus capable of storing, sometimes permanently, machine-implementable instructions, data, and/or information, in analog and/or digital format. Examples include at least one non-volatile memory, volatile memory, register, relay, switch, Random Access Memory, RAM, Read Only Memory, ROM, flash memory, magnetic media, hard disk, floppy disk, magnetic tape, optical media, optical disk, compact disk, CD, digital versatile disk, DVD, and/or raid array, etc. The memory device can be coupled to a processor and/or can store and provide instructions adapted to be executed by processor, such as according to an embodiment disclosed herein. As used herein, the phrase network interface means any physical and/or logical device, system, and/or process capable of coupling an information device to a network. Exemplary network interfaces comprise a telephone, cellular phone, cellular modem, telephone data modem, fax modem, wireless transceiver, Ethernet card, cable modem, digital subscriber line interface, bridge, hub, router, or other similar device, software to manage such a device, and/or software to provide a function of such a device. As used herein, the phrase read means to obtain from a memory device. As used herein, the phrase coupling means (n) a device adapted to join, connect, and/or link. (v) joining, connecting, and/or linking.

As used herein, the phrase processor means a hardware, firmware, and/or software machine and/or virtual machine physically adaptable to perform, via boolean logic operating on a plurality of logic gates, a specific task defined by a set of machine-implementable instructions. A processor can utilize mechanical, pneumatic, hydraulic, electrical, magnetic, optical, informational, chemical, and/or biological principles, mechanisms, adaptations, signals, inputs, and/or outputs to perform the task(s). In certain embodiments, a processor can act upon information by manipulating, analyzing, modifying, and/or converting it, transmitting the information for use by machine-implementable instructions and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium family of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

As used herein, the phrase information device means any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as an iPhone and/or Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

As used herein, the phrase user interface means a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

As used herein, the phrase haptic means both the human sense of kinesthetic movement and the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, fraction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

As used herein, the phrase may means is allowed and/or permitted to, in at least some embodiments. As used herein, the phrase said means when used in a system or device claim, an article indicating a subsequent claim term that has been previously introduced. As used herein, the phrase wherein means in regard to which; and; and/or in addition to.

As used herein, the phrase Boolean logic means a complete system for logical operations. As used herein, the phrase circuit means a physical system comprising: an electrically conductive pathway and/or a communications connection established across a switching device (such as logic gates); and/or an electrically conductive pathway and/or a communications connection established across two or more switching devices comprised by a network and between corresponding end systems connected to, but not comprised by the network. As used herein, the phrase data means distinct pieces of information, usually formatted in a special or predetermined way and/or organized to express concepts, and/or represented in a form suitable for processing by an information device. As used herein, the phrase digital means non-analog and/or discrete. As used herein, the phrase human-machine interface means hardware and/or software adapted to render information to a user and/or receive information from the user; and/or a user interface. As used herein, the phrase logic gate means a physical device adapted to perform a logical operation on one or more logic inputs and to produce a single logic output, which is manifested physically. Because the output is also a logic-level value, an output of one logic gate can connect to the input of one or more other logic gates, and via such combinations, complex operations can be performed. The logic normally performed is Boolean logic and is most commonly found in digital circuits. The most common implementations of logic gates are based on electronics using resistors, transistors, and/or diodes, and such implementations often appear in large arrays in the form of integrated circuits (a.k.a., IC's, microcircuits, microchips, silicon chips, and/or chips). It is possible, however, to create logic gates that operate based on vacuum tubes, electromagnetics (e.g., relays), mechanics (e.g., gears), fluidics, optics, chemical reactions, and/or DNA, including on a molecular scale. Each electronically-implemented logic gate typically has two inputs and one output, each having a logic level or state typically physically represented by a voltage. At any given moment, every terminal is in one of the two binary logic states ("false" (a.k.a., "low" or "0") or "true" (a.k.a., "high" or "1"), represented by different voltage levels, yet the logic state of a terminal can, and generally does, change often, as the circuit processes data. Thus, each electronic logic gate typically requires power so that it can source and/or sink currents to achieve the correct output voltage. Typically, machine instructions are ultimately encoded into binary values of "0"s and/or "1"s and, are typically written into and/or onto a memory device, such as a "register", which records the binary value as a change in a physical property of the memory device, such as a change in voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc. An exemplary register might store a value of "01101100", which encodes a total of 8 "bits" (one byte), where each value of either "0" or "1" is called a "bit" (and 8 bits are collectively called a "byte"). Note that because a binary bit can only have one of two different values (either "0" or "1"), any physical medium capable of switching between two saturated states can be used to represent a bit. Therefore, any physical system capable of representing binary bits is able to represent numerical quantities, and potentially can manipulate those numbers via particular encoded machine instructions. This is one of the basic concepts underlying digital computing. At the register and/or gate level, a computer does not treat these "0"s and "1"s as numbers per se, but typically as voltage levels (in the case of an electronically-implemented computer), for example, a high voltage of approximately +3 volts might represent a "1" or "logical true" and a low voltage of approximately 0 volts might represent a "0" or "logical false" (or vice versa, depending on how the circuitry is designed). These high and low voltages (or other physical properties, depending on the nature of the implementation) are typically fed into a series of logic gates, which in turn, through the correct logic design, produce the physical and logical results specified by the particular encoded machine instructions. For example, if the encoding request a calculation, the logic gates might add the first two bits of the encoding together, produce a result "1" ("0"+"1"="1"), and then write this result into another register for subsequent retrieval and reading. Or, if the encoding is a request for some kind of service, the logic gates might in turn access or write into some other registers which would in turn trigger other logic gates to initiate the requested service. As used herein, the phrase logical means a conceptual representation. As used herein, the phrase machine-readable medium means a physical structure from which a machine, such as an information device, computer, microprocessor, and/or controller, etc., can store and/or obtain machine-implementable instructions, data, and/or information. Examples include a memory device, punch cards, etc. As used herein, the phrase special purpose computer means a computer comprising a processor having a plurality of logic gates, whereby at least a portion of those logic gates, via execution of specific machine instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine instructions to the logic gate's specific configuration and property(ies). In the context of an electronic computer, each such change in the logic gates creates a specific electrical circuit, thereby directly tying the specific machine instructions to that specific electrical circuit. As used herein, the phrase special purpose processor means a processor, having a plurality of logic gates, whereby at least a portion of those logic gates, via execution of specific machine instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine instructions to the logic gate's specific configuration and property(ies). In the context of an electronic computer, each such change in the logic gates creates a specific electrical circuit, thereby directly tying the specific machine instructions to that specific electrical circuit.

DEFINITIONS

When definitions are provided for terms used substantively herein, those definitions apply throughout this document and until amended. Such terms and definitions are presented without prejudice, and, consistent with the application, the right to redefine these terms via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.
Note
Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A method comprising:
   determining a topology of an interconnected set of autonomous systems of the internet via a machine, wherein provider-customer links in the topology are identified as links that only appear in routes propagated from a single tier-1 autonomous system;
   quantifying a completeness of the topology by utilizing a no-valley and prefer customer routing policy and via the provider-customer links in the topology;
   rendering a machine-determined identity of a customer to which telecommunications products are to be offered at a user interface of an information device;
   determining an upper bound estimate of a number of peer-peer links missing from the topology via an equation:

$$V(n)=L-A(1-n\beta)=(L-A)+A\beta n$$

wherein n is a count of monitors, V(n) is a count of visible peer-peer links after observing n monitors, L is a total count of peer-peer links in the internet, $\beta$ is a size of a small scope, and A is a total count of links having the small scope; and
   rendering, at the user interface of the information device, the upper bound estimate of the number of peer-peer links missing from the topology.

2. The method of claim 1, further comprising:
   machine-determining the topology via routeviews and ripe-routing information service.

3. The method of claim 1, wherein:
   a set of rules follows an assumption that the topology comprises all links between tier-1 autonomous systems in the internet.

4. The method of claim 1, further comprising:
   identifying a set of links that appear in routes propagated from a plurality of tier-1 autonomous systems to monitors as the provider-customer links in the topology via the no-valley and prefer customer routing policy.

5. The method of claim 1, further comprising:
   filtering links from the topology that have been determined to have a lifetime of less than two days via the no-valley and prefer customer routing policy.

6. The method of claim 1, further comprising:
   designating identified links as peer-peer links that are not designated as the provider-customer links or tier 1 to tier 1 links.

7. The method of claim 1, further comprising:
   quantifying the completeness of the topology based upon the peer-peer links.

8. The method of claim 1, further comprising:
   inferring a count of public peers of an autonomous system the topology based upon reverse domain name system lookups.

9. The method of claim 1, further comprising:
   determining an upper bound of peer-peer links missing from the topology based upon an inferred count of public peers of a content provider.

10. The method of claim 1, further comprising:
    labeling an autonomous system as a stub autonomous system based upon a determination that the autonomous system has less than four customers.

11. The method of claim 1, further comprising:
    labeling an autonomous system as a small internet service provider based upon a determination that the autonomous system has between five and ninety customers.

12. The method of claim 1, further comprising:
    labeling an autonomous system as a large internet service provider based upon a determination that the autonomous system has greater than ninety customers.

13. The method of claim 1, further comprising:
    determining an expected count of peer autonomous systems via an equation:

$$P_c = \Sigma_i (1-(1-q)^{n_i})$$

wherein C is a content provider, $P_c$ is the expected count of peer autonomous systems to the content provider, i represents all networks that have at least one common presence with the content provider, q is a fixed fraction of networks collocated at an internet exchange point with the content provider, and n is a count of internet exchange points where both C and i have presence.

14. A system comprising:
    a processor configured to:
    determine a topology of an interconnected set of autonomous systems of the internet, wherein peer links in the topology are identified as links that only appear in routes propagated from a single tier-1 autonomous system;
    quantify a completeness of the topology via a no-valley and prefer customer routing policy and via provider-customer links in the topology;
    render an identity of a telecommunications customer that has been determined to be leaving a telecommunications provider at a user interface;
    determine an upper bound estimate of a number of peer-peer links missing from the topology via an equation:

$$V(n)=L-A(1-n\beta)=(L-A)+A\beta n$$

wherein n is a count of monitors, V(n) is a count of visible peer-peer links after observing n monitors, L is a total count of peer-peer links in the internet, $\beta$ is a size of a small scope, and A is a total count of links having the small scope, and
    render the upper bound estimate of the number of peer-peer links missing from the topology at the user interface.

15. A machine-readable medium comprising machine-implementable instructions for activities comprising:
    determining a topology of an interconnected autonomous systems of the internet, wherein peer links in the topology are identified as links that only appear in routes propagated from a single tier-1 autonomous system;
    quantifying a completeness of the topology by utilizing a no-valley and customer routing policy and by utilizing provider-customer links in the topology;
    rendering a determined identity of a customer to which telecommunications products are to be offered at a user interface of an information device;
    determine an upper bound estimate of a number of peer-peer links missing from the topology via an equation:

$$V(n)=L-A(1-n\beta)=(L-A)+A\beta n$$

wherein n is a count of monitors, V(n) is a count of visible peer-peer links after observing n monitors, L is a total count of peer-peer links in the internet, β is a size of a small scope, and A is a total count of links having the small scope;

rendering, at the user interface of the information device, the upper bound estimate of the number of peer-peer links missing from the topology; and filtering links from the topology that have been determined to have a lifetime of less than two days.

\* \* \* \* \*